United States Patent
Kim et al.

(10) Patent No.: US 6,188,041 B1
(45) Date of Patent: Feb. 13, 2001

(54) METHOD AND APPARATUS FOR REAL-TIME WELD PROCESS MONITORING IN A PULSED LASER WELDING

(75) Inventors: Cheol-Jung Kim; Min-Suk Kim; Sung-Hoon Baik; Chin-Man Chung, all of Daejeon-Si (KR)

(73) Assignee: Korea Atomic Energy Research Institute, Daejeon-Si (KR)

( * ) Notice: Under 35 U.S.C. 154(b), the term of this patent shall be extended for 0 days.

(21) Appl. No.: 09/190,234

(22) Filed: Nov. 13, 1998

(51) Int. Cl.[7] .................................................. B23K 26/00

(52) U.S. Cl. ........................... 219/121.63; 219/121.64; 219/121.83; 219/121.85; 219/121.6; 219/121.72

(58) Field of Search ..................... 219/121.63, 121.64, 219/121.83, 121.85, 121.6, 121.72

(56) References Cited

U.S. PATENT DOCUMENTS

| | | | |
|---|---|---|---|
| 4,446,354 | * 5/1984 | Kearney | 219/130.01 |
| 4,766,285 | * 8/1988 | Decailloz et al. | 219/121.63 |
| 5,155,329 | * 10/1992 | Terada et al. | 219/121.83 |
| 5,249,727 | 10/1993 | Eberle et al. . | |
| 5,272,312 | * 12/1993 | Jurca | 219/121.83 |
| 5,283,416 | * 2/1994 | Shirk | 219/121.83 |
| 5,329,091 | * 7/1994 | Bissinger | 219/121.83 |
| 5,360,960 | 11/1994 | Shirk . | |
| 5,463,201 | * 10/1995 | Hedengren et al. | 219/121.83 |
| 5,506,386 | * 4/1996 | Gross | 219/121.64 |
| 5,607,605 | * 3/1997 | Musasa et al. | 219/121.64 |
| 5,651,903 | 7/1997 | Shirk . | |
| 5,674,415 | * 10/1997 | Leong et al. | 219/121.83 |
| 5,681,490 | * 10/1997 | Chang | 219/121.64 |
| 5,728,992 | * 3/1998 | Swidwa | 219/121.64 |

OTHER PUBLICATIONS

U.S. Patent Appln. Serial No. 08/763,752, filed Dec. 11, 1996, Method and System for Spatial Filtering of an Extended Radiation Source with Chromatic Aberration of Imaging Optics in a Single–Element Detector Measurement for Monitoring of the Extended Radiation Source.

Kim et al, "Auto–Focus Control and Weld Process Monitoring of Laser Welding Using Chromatic Filtering of Thermal Radiation", The International Society for Optical Engineering, Sep. 16–19, 1998, Beijing China.

(List continued on next page.)

*Primary Examiner*—Patrick Ryan
*Assistant Examiner*—M. Alexandra Elve
(74) *Attorney, Agent, or Firm*—Arent Fox Kintner Plotkin & Kahn PLLC

(57) ABSTRACT

A method and apparatus for real-time weld process monitoring are provided for a pulsed laser welding. The thermal radiation from a weld pool is measured at several spectral bands through an aperture with single-element detectors after splitting the spectral bands with dichromatic mirrors and beam splitters. The distal end of an optical fiber for laser delivery can be used as an aperture and each spectral band signal is measured with a single-element detector. Due to the chromatic aberration of an imaging optics, the field of view from a single-element detector through the aperture is varied by the wavelength of spectral band. The weld pool size contributing to the spectral band signal varies by the wavelength of the spectral band. The transmittance profile of each spectral band also depends on the focus shift of imaging optics. By processing the measured spectral band signals, the size of a weld pool, the power variation on a workpiece and the focus shift of imaging optics can be monitored simultaneously. Furthermore, the weld pool sizes at predetermined positions in time are correlated to the weld depth and the weld defect such as a weld gap for weld quality assurance.

32 Claims, 14 Drawing Sheets

OTHER PUBLICATIONS

Kim et al, Size Variation Monitoring of an Extended Thermal Radiation Source by Chromatic Filtering, Optics Communications 152, (Jul. 1, 1998), pp. 239–242.

Kim et al, Optical Weld Monitoring for Laser Sleeve Repair Welding of Steam Generator, Jun. 9–12, 1998, Scottsdale, Arizona.

Chung et al, "Comparison of Ultrasonic Weld–Width Measurement and Optical Weld–Depth Monitoring in Laser Sleeve Welding", Laser Institute of America, Nov. 17–20, 1997, San Diego, California.

Kim et al, "Auto–Focus Control With Optical Monitoring Using Chromatic Aberration of Focusing Optics in Laser Welding", Laser Institute of America, Nov. 17–20, 1997, San Diego, California.

* cited by examiner

METHOD AND APPARATUS FOR REAL-TIME WELD PROCESS MONITORING IN A PULSED LASER WELDING

BACKGROUND OF THE INVENTION

1. Field of the Invention

The present invention relates in general to weld process monitoring techniques, and more particularly to an improved method and apparatus for real-time monitoring of thermal radiation of a weld pool to monitor a focus shift, a power variation and a weld depth for weld process control and a weld defect for weld process quality assurance, utilizing the chromatic aberration of focusing lens or lenses.

2. Description of the Prior Art

The application of high power Nd:YAG lasers for precision welding in industry has been rapidly growing quite recently in diverse areas such as for the automotive, electronic and aerospace industries. Nowadays, as much as 6 kW of average power is available in the market. Delivery of the power by fiber optics makes it useful for many remote applications. On the other hand, these diverse applications also require using the latest developments for precise control and reliable process monitoring. Due to the hostile environment during laser welding, remote monitoring is required and many acoustic and optical remote monitoring techniques have been developed. However, acoustic monitoring is not suitable for the application in a factory due to the acoustic interference from environmental noise including mechanical noise. Therefore, optical monitoring is preferred in industrial applications.

Two approaches for optical monitoring have been followed: one monitors the image of a weld pool with a CCD or an IR camera and the other monitors the radiation from a weld pool with one or more single-element detectors. The monitoring of an image requires fast data processing and is quite expensive and complicated to implement. Furthermore, the monitoring of an image is not applicable to laser welding with a laser delivery fiber because the image of a weld pool can not be transmitted through a single-core laser delivery fiber. On the other hand, the monitoring of radiation is simple and cheap to implement, and fast and robust for industrial applications. However, the information on a weld pool status is narrowed for radiation monitoring. Therefore, several spectral bands of radiation from UV to IR have been monitored with a plurality of detectors to broaden the information on a weld pool status. Examples of such a method or apparatus for weld monitoring can be found in U.S. Pat. Nos. 4,446,354, 5,272,312, 5,360,960, 5,506,386, 5,651,903, 5,674,415, 5,681,490 and 5,728,992.

Many focus shift and power variation monitoring techniques have been developed. However, interference between them has been neglected. Usually, the focus shift has been considered independently from the power variation. However, the focus shift and the power variation are closely related and can not be considered independently. For example, many focus shift monitoring techniques are affected by power variation. Usually, the power variation of a laser itself can be easily monitored. On the other hand, the power variation on a workpiece can be induced by the transmission loss of the delivery optics. In other words, many focus shift monitoring techniques can not be applied to laser welding due to power variation. However, the monitoring of power variation on the workpiece is quite important for precision welding and process automation. Sometimes, the laser has to be stopped before the failure in delivery optics brings a disaster. Therefore, both focus shift monitoring and power variation monitoring are required simultaneously for industrial precision laser welding. Furthermore, focus shift monitoring should not be affected by power variation monitoring and vice versa. For the forgoing reasons, there is a need to discriminate the focus shift from the power variation. The meaning of the discrimination between the focus shift and the power variation is described below in "Summary of the Invention".

The importance of the simultaneous monitoring of power variation and focus shift for precision laser welding is explained above. However, the weld depth in laser welding depends not only on the focus shift and the power variation but also on environmental parameters such as the temperature of a workpiece, the flow rate of a shielding gas and the weld gap. For a precision laser welding, the variation of weld depth induced by the changes in the environmental parameters has to be compensated. To compensate the weld depth variation due to the changes in these environmental parameters, the laser power has to be adjusted to compensate the weld depth variation induced by these environmental changes. One example is the weld depth variation at the beginning of a seam welding. Therefore, there is a need for weld depth monitoring for precision laser welding. Furthermore, the monitoring of a weld defect such as a weld gap is also required to verify the weld quality and to determine the cause of bad welding. This kind of comprehensive weld process monitoring has never been demonstrated.

SUMMARY OF THE INVENTION

Hence it is the fundamental object of the present invention to provide a method and an apparatus whereby the simultaneous monitoring of the focus shift and the power variation can be obtained in a manner which is simple and suitable for industrial application. It is another object of the present invention to provide a method and an apparatus whereby the weld depth and the weld defects can be monitored for both weld process control and weld quality assurance.

These objects are satisfied by utilizing the chromatic filtering of the thermal radiation of a weld pool. A method and apparatus for real-time weld process monitoring are provided for a pulsed laser welding. The thermal radiation from a weld pool is measured at several spectral bands through an aperture with single-element detectors after splitting the spectral bands with dichromatic mirrors and beam splitters. The distal end of an optical fiber for laser delivery can be used as an aperture and each spectral band signal is measured with a single-element detector. Due to the chromatic aberration of an imaging optics, the field of view from a single-element detector through the aperture is varied by the wavelength of spectral band. The weld pool size contributing to the spectral band signal varies by the wavelength of the spectral band. The transmittance profile of each spectral band also depends on the focus shift of imaging optics. By processing the measured spectral band signals, the size of a weld pool, the power variation on a workpiece and the focus shift of imaging optics can be monitored simultaneously. Furthermore, the weld pool sizes at predetermined positions in time are correlated to the weld depth and the weld defect such as a weld gap for weld quality assurance.

In conclusion, the monitoring of weld pool size variation is achieved with a plurality of single-element detectors by utilizing the chromatic filtering of the thermal radiation from a weld pool. The use of a plurality of single-element detectors rather than a CCD or IR camera in monitoring the size of a weld pool makes it very fast to process the data and cheap to implement for industrial application. The monitoring of weld pool size variation can also be used to monitor the weld depth and the weld gap by utilizing the information on the weld pool size variation and the slope of weld pool size variation at predetermined locations in time during the cooling stage. Furthermore, the interference between power variation monitoring and focus shift monitoring has been minimized and discrimination between power variation monitoring and focus shift monitoring can be achieved by optimizing the chromatic filtering of the thermal radiation from a weld pool.

These and other features, aspects and advantages of the present invention will become better understood with preference to the following description and appended claims.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Embodiments of the present invention will now be described in greater detail for a pulsed laser welding with 1.06 µm Nd:YAG laser with reference to more specific drawings and data, which are for a better understanding of the invention and not for limiting purposes.

Figure 1:
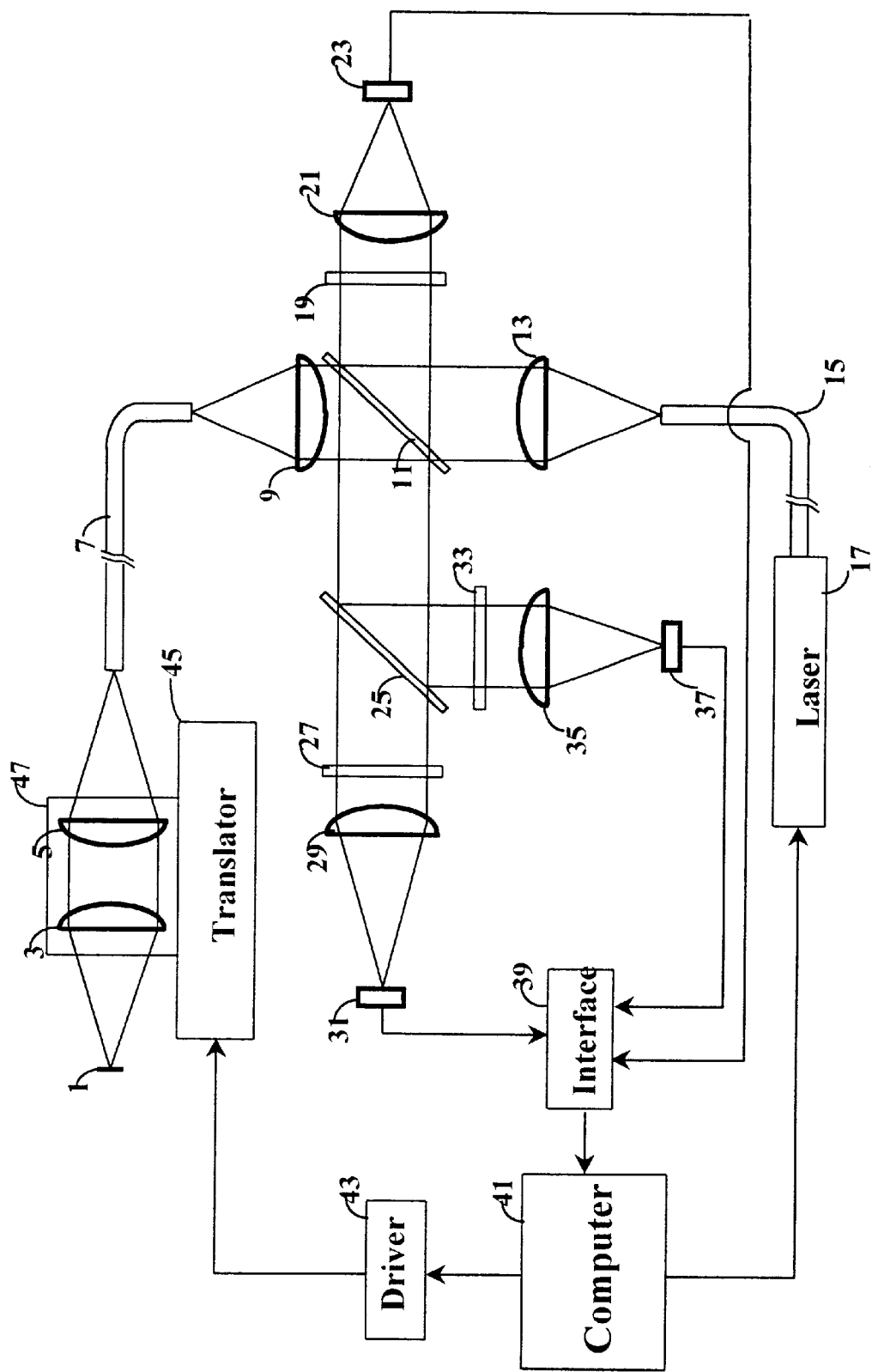
FIG. 1 is a schematic representation of a system for chromatic filtering of thermal radiation from a weld pool in accordance with the present invention.

FIG. 1 illustrates a schematic representation of a system for chromatic filtering of thermal radiation from a weld pool in accordance with the present invention. The weld pool 1 is generated by focusing the laser pulses from a pulsed laser 17 with imaging lenses 3 and 5 after being transmitted through a fiber 7 with an aperture at the distal end. The thermal radiation from a weld pool 1 is imaged on the aperture by the imaging lenses 3 and 5 and delivered through the fiber 7. Then, the thermal radiation is collimated by a lens 9 and is reflected by a dichromatic mirror 11, which transmits the laser beam from a pulsed laser source 17 delivered through another fiber 15, but reflects the thermal radiation for chromatic filtering. A small portion of laser beam reflected from the dichromatic mirror 11 is reduced in intensity by a density filter 19, focused by a lens 21 on a single-element Si detector 23 for synchronization between the start of each laser pulse and the thermal radiation measurement. The dichromatic mirror 11 shown in FIG. 1 is reflecting the thermal radiation to measure, but transmitting the wavelength 1.06 µm Nd:YAG laser. However, a dichromatic mirror which reflects the wavelength 1.06 μm Nd:YAG laser, but transmits the thermal radiation to measure can also be used as a dichromatic mirror to separate the laser and the thermal radiation. Then, the positions of the fiber 15 and the pulsed laser source 17 have to be exchanged with the positions of a dichromatic beam splitter 25 and following thermal radiation detecting components.

The reflected thermal radiation is divided into two spectral bands with a dichromatic beam splitter 25 which reflects one spectral band but transmits the other spectral band. The transmitted spectral band is filtered with a band-pass filter 27 with the bandwidth of about one hundredth to about one tenth of the laser wavelength, and focused by a lens 29 on a single-element Si detector 31. The reflected spectral band is also filtered with a band-pass filter 33 with the bandwidth of about one hundredth to about one tenth of the laser wavelength, and focused by a lens 35 on a single-element Si detector 37. If the bandwidths of the band-pass filers 27 and 33 become too narrow, the detector signals become too small to be detected with a single-element Si detector. However, if the bandwidths of the band-pass filers 27 and 33 become too wide, the chromatic filtering becomes blurred and loses accuracy. The detector outputs from the three detectors 23, 31, 37 are connected to a processing computer 41 through an interface 39. The process computer 41 controls the position of a translator 45 through a driver 43 and also controls the output power of the pulsed laser 17.

The interface 39 samples the detector signals of all spectral bands digitally. The digitization resolution should be higher than 8 bits to maintain the accuracy of the digitized data during processing. However, if it is higher than 16 bits, the data processing speed will become slow. The 12 to 16 bits of digitization resolution is good enough to maintain accuracy and keep the fast data processing speed. The sampling rate should also be high enough to accurately locate the minimum valley and the sudden weld pool size reduction after the end of a laser pulse. The sampling interval is required to be less than 1 msec. A time interval between 10 μsec to 100 μsec is preferred. However, if the time interval is less than 1 μsec, the data processing speed will become slow. Furthermore, the interface should be able to adjust the start of the sampling to remove the digitized data which will not be used for the weld process monitoring. The timing resolution of about 0.1 msec is good enough in adjusting the delay. Finally, the interface 39 should be able to adjust the number of samplings for each pulse. It depends on the application, but usually it can be around a couple of hundreds without reducing the data processing speed.

The processing computer 41 should store the digitized spectral band signals, process the digitized spectral band signals and analyze the processed signals for the weld process monitoring and control. The various calculations can be processed as soon as the digitized spectral band signals are stored for faster data processing speed or they can be processed after all the digitized spectral band signals are stored. Furthermore, the processing computer 41 displays in real-time a signal related to the amount of focus shift for each pulse for the monitoring of the focus shift, produces an error signal when the signal related to the amount of focus shift is outside from the range determined by a predetermined upper limit and a predetermined lower limit to adjust the position of the focusing lens or lenses using the error signal provided above and a predetermined focus shift sensitivity to correct the focus shift error. The processing computer 41 also displays in real-time a signal related to the power variation on a workpiece for each pulse for the monitoring of power variation on a workpiece, displays in real-time a signal related to the weld pool size variation in time for each pulse, displays in real-time a signal related to the weld pool size at a predetermined position in time for each pulse for the monitoring of weld depth, adjusts the power of a laser if the signal related to the weld pool size at a predetermined position in time deviates from the predetermined allowable range and displays in real-time a signal related to the slope of weld pool size reduction determined by two predetermined positions in time for each pulse for the monitoring of weld gap or other environmental changes.

For chromatic filtering, at least two spectral bands have to be measured, one wavelength $W_1$ quite near to the laser wavelength but quite far from the laser wavelength to be separated by a dichromatic mirror and an optical band-pass filter from the laser during the laser on-time and the other wavelength $W_2$ quite far from $W_1$ to introduce a large chromatic aberration on the imaging optics. If the wavelength $W_1$ is adjusted within about one tenth to about two tenths of the pulsed laser wavelength, the chromatic aberrations at the wavelength $W_1$ and at the pulsed laser wavelength are almost the same. This means that both the wavelength $W_1$ and the wavelength of a pulsed laser have the same focus. Furthermore, a dichromatic mirror reflecting a pulsed laser can be designed to have enough transmittance at the wavelength $W_1$ to be detected or a dichromatic mirror transmitting a pulsed laser can be designed to have enough reflectance at the wavelength $W_1$ to be detected. On the other hand, the contribution of a pulsed laser to the spectral band signal at the wavelength $W_1$ can be blocked completely with a dichromatic mirror and the band-pass filter with a bandwidth of about one hundredth to about one tenth of the laser wavelength. The shorter wavelength is preferred for the wavelength $W_2$ because the chromatic aberration becomes larger at the shorter wavelength.

In chromatic filtering, a plurality of laser pulses are transmitted through an aperture and are focused on a workpiece with imaging optics which images the aperture on the workpiece. A plurality of spectral bands of thermal radiation from a weld pool are imaged on the aperture with the imaging optics consisted with one or more lenses with a large chromatic aberration and the transmitted spectral bands are measured separately with the plurality of single-element detectors. The aperture acts as a field-stop and it limits the area that can be seen through the imaging optics by a single-element detector. In other words, due to the chromatic aberration of the imaging optics, a single-element detector can obtain thermal radiation from a wider area of a weld pool, even if only small portion of the thermal radiation is transmitted, at the wavelength with larger chromatic aberration than at the wavelength close to the laser wavelength during laser welding. The dependence of a single-element detector signal of each spectral band on the focus shift of a workpiece and on the wavelength of each spectral band provides the methods for monitoring of the weld pool size, the weld depth, the weld gap, the power variation and the focus shift.

In laser welding, a weld pool is generated by a focused laser beam delivered through the imaging optics and the aperture can be the distal end of an optical fiber. Then, the detector signal of each spectral band measured with a single-element detector is the integration of the multiplication of the emission intensity at the wavelength of the spectral band from each point source of a weld pool and the transmittance of the wavelength at the position of the point source over the field of view of the single-element detector at the wavelength. Therefore, if the detector signals of different spectral bands are separated by dichromatic beam splitters and band-pass filters, the variation in the field of view between the different spectral bands can provide some information on the size variation of a weld pool. Furthermore, the transmittance at the wavelength of each spectral band also depends on the focus shift of the workpiece and the variation in the transmittance by the focus shift can be used for the monitoring of the focus shift of a workpiece.

Before going into further detail, a definition of what is meant by the "discrimination" in the simultaneous monitoring of the focus shift and the power variation is provided. Any focus shift monitoring is affected by power variation if the power variation is large enough and vice versa. However, an allowable depth variation in a laser welding can be determined from welding specifications. For example, it can be one tenth or two tenths of the required weld depth. This allowable depth variation can define the allowable power variation for power monitoring which induces the same amount of depth variation and the allowable focus shift for focus shift monitoring in the same way.

Furthermore, the minimum detectable power variation only for power monitoring and the minimum detectable focus shift only for the focus monitoring can be determined. For industrial application, the desired focus control range should be larger than the allowable focus shift for dependable and reliable focus control. However, the focus shift at the maximum control range can affect the power monitoring and induce some error in the power monitoring. The sum of this induced error and the minimum detectable power variation should be smaller than the allowable power variation for reliable power monitoring.

The effect of power variation on focus shift monitoring at the power variation of an allowable power variation plus the error induced by the maximum focus shift has to be considered. If the sum of the minimum detectable focus shift and the induced error during focus shift monitoring at the power variation of the allowable power variation plus the induced error at the maximum focus control range is smaller than the allowable focus shift, then a focus shift, which is less than the allowable focus shift, can be monitored even if the laser power varies within the allowable power variation without any compensation for the power variation. This criterion is simple, but it can not be obtained easily in reality. The focus shift monitoring should be optimized to minimize the induced error from the power variation and vice versa. Then, the power variation and the focus shift can be discriminated during weld process monitoring.

To be more quantitative, a weld pool can be approximated to the first order as a uniform thermal radiation source at temperature T. It is well known in the art that Planck's radiation equation can be approximated by Wien's law if the multiplication of the wavelength of a spectral band in microns and the temperature of a radiation source in K, $\lambda T$, is much smaller than 14380 $\mu mK$. Therefore, in laser welding, Wien's law can be applicable from the visible range up to the near IR range as shown below. If the thermal radiation is measured at one wavelength $W_1$ quite near to the laser wavelength but quite far from the laser wavelength to be separated by a dichromatic mirror and an optical band-pass filter from the laser during the laser on-time and at the other wavelength $W_2$ quite far from $W_1$ to introduce a large chromatic aberration on the imaging optics, the signal of a spectral band measured at a detector can be described as follow:

The signal of a spectral band at wavelength $W_1$ becomes $$X = C_1 \mathrm{Exp}\left(\frac{-14380}{W_1 T}\right)\int_o^{ro} t_1 r\, dr \quad (1)$$

$$= C_1 \mathrm{Exp}\left(\frac{-14380}{W_1 T}\right) F(W_1, r_0)$$

where $C_1$ is a constant, T is the temperature of a weld pool in K, $W_1$ is the wavelength in microns and $t_1$ is the transmittance profile at wavelength $W_1$ and $r_0$ is the radius of a weld pool.

Likewise, the signal of a spectral band at wavelength $W_2$ becomes $$Y = C_2 \mathrm{Exp}\left(\frac{-14380}{W_2 T}\right)\int_o^{ro} t_2 r\, dr \quad (2)$$

$$= C_2 \mathrm{Exp}\left(\frac{-14380}{W_2 T}\right) F(W_2, r_0)$$

where $C_2$ is a constant, T is the temperature of weld pool in K, $W_2$ is the wavelength in microns, $t_2$ is the transmittance profile at wavelength $W_2$ and $r_0$ is the radius of a weld pool.

If the spectral band signals X,Y and X',Y' are measured with some time interval, the ratios of the spectral band signals expressed in natural logarithm are $$\ln(X/X') = \frac{14380}{W_1}\left(\frac{1}{T'} - \frac{1}{T}\right) + \ln(F(W_1, r_0)) - \ln(F(W_1, r_0')) \quad (3)$$

$$\ln(Y/Y') = \frac{14380}{W_2}\left(\frac{1}{T'} - \frac{1}{T}\right) + \ln(F(W_2, r_0)) - \ln(F(W_2, r_0')) \quad (4)$$

where T' and $r_0'$ are the reduced temperature and the reduced weld pool size after the time interval, respectively.

If the temperature dependent parts are canceled out, $$\ln(Y/Y') - \frac{W_1}{W_2}\ln(X/X') = \left\{\ln(Y)\frac{-W_1}{W_2}\ln(X) + C_3\right\} - \left\{\ln(Y')\frac{-W_1}{W_2}\ln(X') + C_3\right\} \quad (5)$$

$$= \{\ln(F(W_2, r_0)) - \ln(F(W_2, r_0'))\} - \frac{W_1}{W_2}\{\ln(F(W_1, r_0)) - \ln(F(W_1, r_0'))\}$$

$$= \left\{\ln(F(W_2, r_0)) - \frac{W_1}{W_2}\ln(F(W_1, r_0))\right\} - \left\{\ln(F(W_2, r_0')) - \frac{W_1}{W_2}\ln(F(W_1, r_0'))\right\}$$

$$= S(W_1, W_2, r_0) - S(W_1, W_2, r_0')$$

where $C_3$ is a constant determined by the gain of the detectors and the constants $C_1$ and $C_2$.

The measurable quantity of $\{\ln(Y)-(W_1/W_2)\ln(X)+C_3\}$ can not be compared directly to the calculated value of $\ln(F(W_2,r_0))-(W_1/W_2)\ln(F(W_1,r_0))$, which is a function of the radius of a weld pool and can be calculated from the optical design parameters of the imaging optics, to determine the size of a weld pool due to the unpredictable constant $C_3$. However, the difference in any two measurable values of $\{\ln(Y)-(W_1/W_2)\ln(X)+C_3\}$ can be directly compared to the difference in the calculated values of $\ln(F(W_2, r_0))-(W_1/W_2)\ln(F(W_1,r_0))$ at the corresponding two weld pool sizes. This means that the value of $\{\ln(Y)-(W_1/W_2)\ln(X)+C_3\}$ must be known for at least one weld pool size. Then, the weld pool size can be determined by comparing the difference in the measured and the known values of $\{\ln(Y)-(W_1/W_2)\ln(X)+C_3\}$ to the difference in the calculated values of $\ln(F(W_2,r_0))-(W_1/W_2)\ln(F(W_1,r_0))$ at the corresponding two weld pool sizes. A question remains, how can the value of $\{\ln(Y)-(W_1/W_2)\ln(X)+C_3\}$ be found at some weld pool size?

The field of view at the wavelength $W_1$ is smaller than the field of view at the wavelength $W_2$ due to chromatic aberration of the imaging optics. Therefore, the function $\ln(F(W_1,r_0))$ wherein the function $F(W_1,r_0)$ is just the integration of the transmittance at the wavelength $W_1$ over the area with a radius of $r_0$ becomes a constant if the radius $r_0$ becomes larger than the field of view at the wavelength $W_1$ because the transmittance at the wavelength $W_1$ becomes zero outside of the field of view. However, the function $\ln(F(W_2,r_0))$ is still increasing up to the field of view at the wavelength $W_2$.

This means that the function $\ln(F(W_2,r_0))-(W_1/W_2)\ln(F(W_1,r_0))$ has a minimum valley near the field of view at the wavelength $W_1$. In other words, the measured value of $\{\ln(Y)-(W_1/W_2)\ln(X)+C_3\}$ corresponding to this valley should be a minimum. This minimum valley can be used as an absolute reference in determining the size of a weld pool in time. The size variation of a weld pool in time can be monitored by calculating the difference of the measured value of $\{\ln(Y)-(W_1/W_2)\ln(X)+C_3\}$ from the minimum value at the valley and comparing the difference of the measured value of $\{\ln(Y)-(W_1/W_2)\ln(X)+C_3\}$ from the minimum value at the valley to the deviation from the minimum valley in the function $\ln(F(W_2,r_0))-(W_1/W_2)\ln(F(W_1,r_0))$. Thus, the size of a weld pool is determined by choosing the weld pool size wherein the deviation between the value of the function $\ln(F(W_2,r_0))-(W_1/W_2)\ln(F(W_1 r_0))$ at that size and the value at the minimum of the function $\ln(F(W_2,r_0))-(W_1/W_2)\ln(F(W_1,r_0))$ matches the difference calculated above.

For some values of difference in $\{\ln(Y)-(W_1/W_2)\ln(X)+C_3\}$ from the minimum value, two radii can be located on both side of the valley with the same deviation in the function $\ln(F(W_2,r_0))-(W_1/W_2)\ln(F(W_1,r_0))$. The ambiguity in radii can be easily solved from knowing the status of the weld process. It is known that the size of a weld pool is increasing during the laser-on time and is decreasing during the cooling stage. The ambiguity can be solved by attaching a plus or a minus sign depending on the location of the minimum valley in time. If the minimum valley occurs later than the measuring time of $\{\ln(Y)-(W_1/W_2)\ln(X)+C_3\}$, the deviation is expressed as positive and as negative if occurs earlier.

To find the minimum valley, the spectral band signals, X and Y, have to be detected and sampled digitally during a laser pulse and between the pulses when a weld pool cools down. The sampling rate should be high enough to locate the minimum valley accurately. The sampling resolution also should be high enough to maintain the accuracy of the digitized data during processing.

On the other hand, the amount of sudden size reduction at a predetermined position in time after the end of a laser pulse shows a correlation with the weld depth. The slope of weld pool size reduction determined by two predetermined positions in time during the cooling stage also shows a correlation with the changes in environmental parameters including a weld gap. This means that the cooling, through larger interfacing area deep inside of a weld pool, makes the amount of sudden size reduction bigger for a deeply penetrated welding. On the other hand, if there is a gap between the upper and the lower weld metals, the cooling speed is reduced due to the insulation from the air gap.

If the weld pool size is larger than the field of view at wavelength $W_1$ during the time interval, then $\ln(F(W_1, r_0))$ is equal to $\ln(F(W_1, r_0'))$ and $\ln(X/X')$ becomes $$\ln(X/X') = \frac{14380}{W_1}\left(\frac{1}{T'} - \frac{1}{T}\right) \quad (6)$$

In other words, the temperature drop rate can be monitored. Furthermore, the variation in temperature drop rate during laser welding can be utilized to monitor the power variation if the spectral band signals X and X' are measured during the laser-on time when the weld pool size is still larger than the field of view at wavelength $W_1$. To maintain the requirement of the measurement when the weld pool size is still larger than the field of view at wavelength $W_1$, the short time interval of about 10 μsec to about 100 μsec between the X and X' measurement is preferred. Furthermore, both the measurements of X and X' have to be finished before the start of the cooling stage. If a workpiece is positioned at the best focus of the laser, the spectral band signals X and X' are also measured at the best focus due to the small chromatic aberration between the laser wavelength and the wavelength $W_1$. Therefore, both the measurements of X and X' signals are insensitive to the focus shift because the spectral band image of a weld pool at the wavelength $W_1$ has the longest depth of focus at the best focus. It means that the induced error from the focus shift is minimized.

On the other hand, the natural logarithm of the ratio of X over Y is $$\ln(X/Y) = \quad (7)$$
$$\ln(C_1/C_2) + \frac{14380}{T}\left(\frac{1}{W_2} - \frac{1}{W_1}\right) + \{\ln(F(W_1, r_0)) - \ln(F(W_2, r_0))\}$$

The second term depends on the power variation, the workpiece temperature, the lens temperature, etc. The temperature decreases quite fast during the cooling stage and it is not easy to monitor the weld pool at the same temperature during the focus shift monitoring. The most stable sampling can be obtained at the end of a laser pulse when the plasma induced by a laser pulse is extinguished but the cooling has not been initiated. It is known that the temperature fluctuation induced by a small power variation is small in laser welding. Therefore, the induced error from the power variation is minimized by measuring the $\ln(X/Y)$ before the end of a laser pulse when the weld pool is still larger than the focused laser spot size. Then, the focus shift dependence of the third term in Eq.(7) is utilized for the monitoring of the focus shift.

In conclusion, the monitoring of weld pool size variation is achieved with a plurality of single-element detectors by utilizing the chromatic filtering of the thermal radiation from a weld pool. The use of a plurality of single-element detectors rather than a CCD or IR camera in monitoring the size of a weld pool makes it very fast to process the data and cheap to implement for industrial application. The monitoring of weld pool size variation can also be used to monitor the weld depth and the weld gap by utilizing the information on the weld pool size variation and the slope of weld pool size variation at predetermined locations in time during the cooling stage. Furthermore, the interference between power variation monitoring and focus shift monitoring has been minimized and discrimination between power variation monitoring and focus shift monitoring can be achieved by optimizing the chromatic filtering of the thermal radiation from a weld pool.

Figure 2:
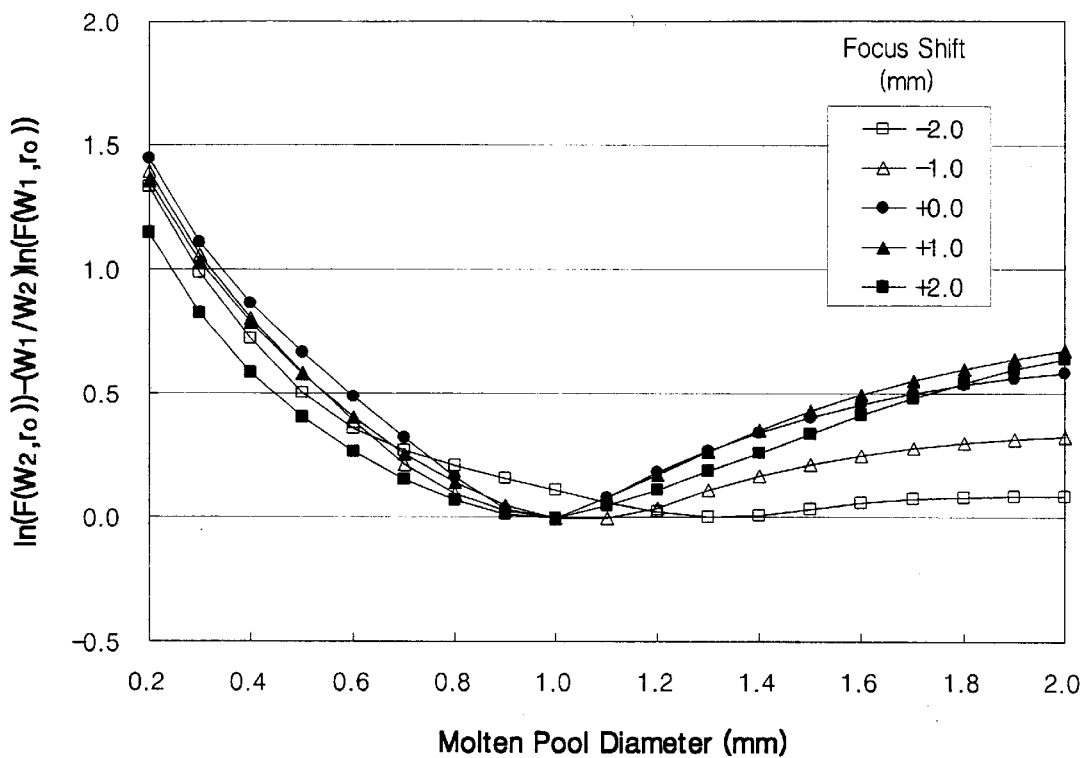
FIG. 2 shows $\ln(F(W_2,r_0))-(W_1/W_2)\ln(F(W_1,r_0))$ and its dependence on the focus shift for an optimized optical system made of high index of refraction glass SF11 with 100 mm focal length at F/3.8.

FIG. 2 shows $\ln(F(W_2,r_0))-(W_1/W_2)\ln(F(W_1,r_0))$ and its dependence on the focus shift for an optimized optical system made of high index of refraction glass SF11 with 100 mm focal length at F/3.8. The wavelength 950 nm spectral band is chosen as the wavelength $W_1$ and the wavelength 650 nm spectral band is chosen as the wavelength $W_2$. The ordinate is a calculated value of $\ln(F(W_2,r_0))-(W_1/W_2)\ln(F(W_1,r_0))$ represented in unitless number, but the minimum values in the curves of $\ln(F(W_2,r_0))-(W_1/W_2)\ln(F(W_1,r_0))$ have been aligned in parallel to zero because only the difference in the curves of $\ln(F(W_2,r_0))-(W_1/W_2)\ln(F(W_1,r_0))$ at two points has physical meaning. The abscissa represents a diameter of a weld pool in mm. As shown in FIG. 2, the weld pool size monitoring is quite insensitive to the focus shift if the weld pool size smaller than the laser spot size of 1.0 mm is monitored. However, the weld pool size monitoring is sensitive to the focus shift to the shorter direction if the weld pool size larger than the 1.0 mm laser spot size is monitored. The reason is that the transmittance profiles at the wavelength 950 nm and the wavelength 650 nm become similar to each other as the focus shift to the shorter direction becomes larger. Therefore, the weld pool size monitoring can not be obtained at a large inward focus shift. However, the monitoring of a weld pool size smaller than the 1.0 mm laser spot size is important to monitoring of the weld depth and environmental change. Therefore, weld depth and environmental change monitoring can be achieved even if some focus shift is introduced during the monitoring. In other words, the induced error on the weld pool size monitoring from the focus shift can be neglected within some range of focus shift. This means the simultaneous monitoring of the focus shift and the weld pool size can be achieved as shown in FIG. 2 with the imaging optics shown in FIG. 1.

Figure 3:
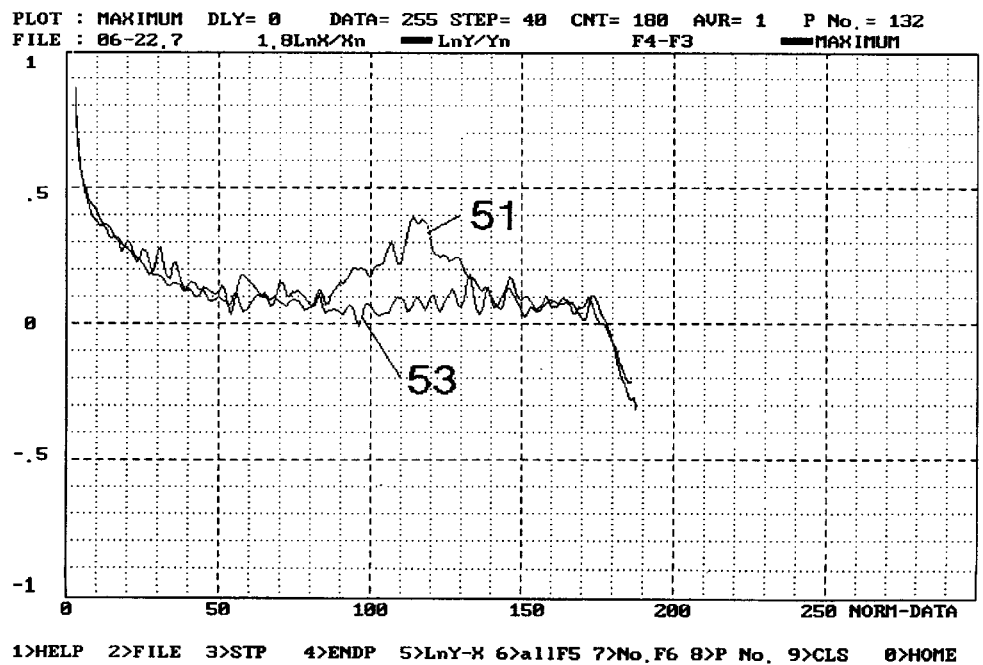
FIG. 3 shows the variation of the difference between the measured value of $\{\ln(Y)-(W_1/W_2)\ln(X)+C_3\}$ and the minimum of those measurements in time during a single pulse in the series of laser pulses for high power and for low power laser welding.

FIG. 3 shows the variation of the difference between the measured value of $\{\ln(Y)-(W_1/W_2)\ln(X)+C_3\}$ and the minimum of those measurements in time during a single pulse in the series of laser pulses for high power and for low power laser welding. The ordinate represents the difference in unitless number and the abscissa represents the measured time from the start of a single pulse as the number of sampling. The sampling interval is 40 μsec. The trace 51 shows the difference at the average power of 250 W and the trace 53 shows the difference at the average power of 170 W. In both cases, the laser pulse width and the pulse repetition rate are 7.5 msec and 20 HZ respectively.

At the average power of 250 W, the weld pool size increases from the start of a laser pulse and passes the size of the minimum valley near the $70^{th}$ sampling and, as the deep penetration occurs in the middle of a laser pulse near the $110^{th}$ sampling, it starts to shrink and passes the minimum valley again near the end of a laser pulse near the $160^{th}$ sampling. As mentioned above, to avoid ambiguity, the minimum value is searched from the data sampled later than 6 msec from the start of the laser pulse. By comparing the ordinates of FIG. 2 and FIG. 3, the weld pool size variation in time can be monitored quantitatively. The trace 51 shows that the weld pool size passes the size at the minimum valley at around 2 msec from the start of the laser pulse, becomes the maximum size of about 1.5 mm at around 4.5 msec from the start of the laser pulse and passes the size at the minimum valley at around 7 msec from the start of the laser pulse. The phenomena that the weld pool size shrinks near the 7 msec can be explained by the laser pulse shape which starts to decrease around 7 msec from the start of a laser pulse even if the pulse width is set at 7.5 msec. On the other hand, at the average power of 170 W, the trace 53 shows the weld pool size passes the size at the minimum valley at around 4 msec from the start of the laser pulse and the maximum weld pool size is about 1.1 mm. Furthermore, both trace 51 and trace 53 show the sudden size reduction just after the end of a laser pulse. In conclusion, the quantitative real-time monitoring of the size of a weld pool during laser-on time and during the cooling stage is achieved using the chromatic filtering method.

Figure 4:
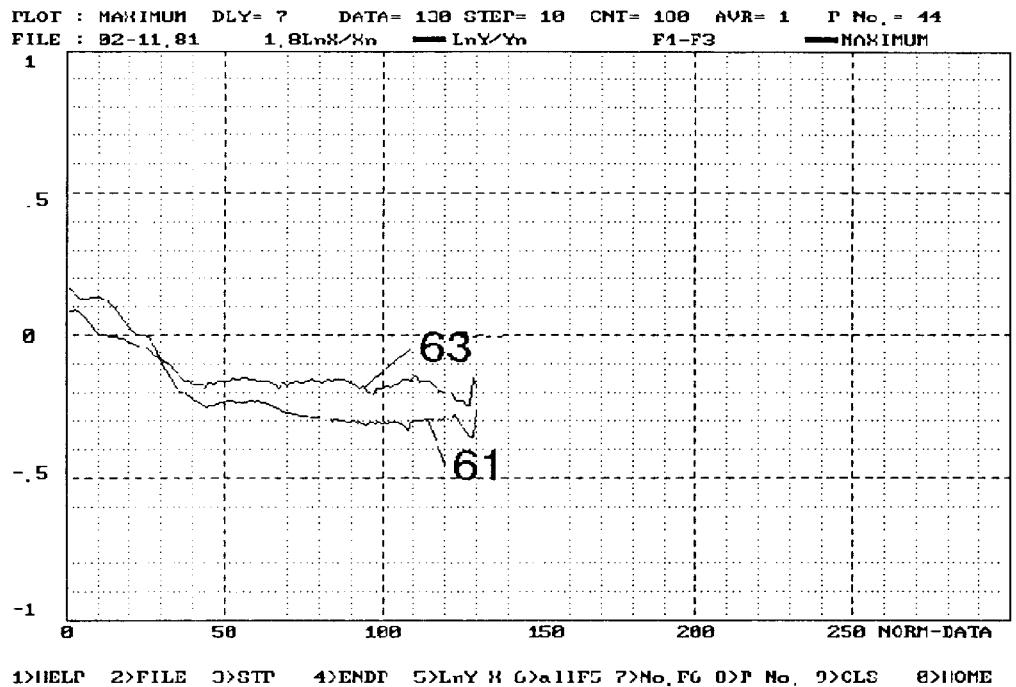
FIG. 4 is another graph showing the variation of the difference between the measured value of $\{\ln(Y)-(W_1/W_2)\ln(X)+C_3\}$ and the minimum of those measurements for a single pulse in the series of pulses for high power and for low power laser welding from the end of a laser pulse through the cooling stage.

FIG. 4 is another graph showing the variation of the difference between the measured value of $\{\ln(Y)-(W_1/W_2)\ln(X)+C_3\}$ and the minimum of those measurements for a single pulse in the series of pulses for high power and for low power laser welding from the end of a laser pulse through the cooling stage. The ordinate represents the difference in unitless number and the abscissa represents the measuring time from 7.2 msec after the start of a pulse as the number of sampling. The sampling interval is 10 μsec. The trace 61 shows the difference at the average power of 300 W and the trace 63 shows the difference at the average power of 200 W. In both cases, the laser pulse width and the pulse repetition rate are 7.5 msec and 20 HZ respectively. As shown in FIG. 4, the weld pool size becomes stable after a sudden reduction in weld pool size for both high power and low power. The amount of a sudden reduction in weld pool size which is related to the fast cooling through the interface inside the weld pool shows the correlation to the weld depth. FIG. 4 also shows that the timing when the weld pool size passes the size at the minimum valley is earlier for the lower power laser welding due to the smaller weld width for lower power laser welding even if the internal cooling through the interface is slower. Furthermore, there is some jittering in synchronizing the start of the sampling to the start of a laser pulse due to some fluctuation in the laser pulse shape. Therefore, to monitor the weld depth, it is better to align the timing when the weld pool size passes the size at the minimum valley at the same time. Then, the weld pool size at a predetermined time from the aligned time shows the pulse-to-pulse variation of a weld depth during laser welding. The predetermined time varies by the weld parameters.

Figure 5:
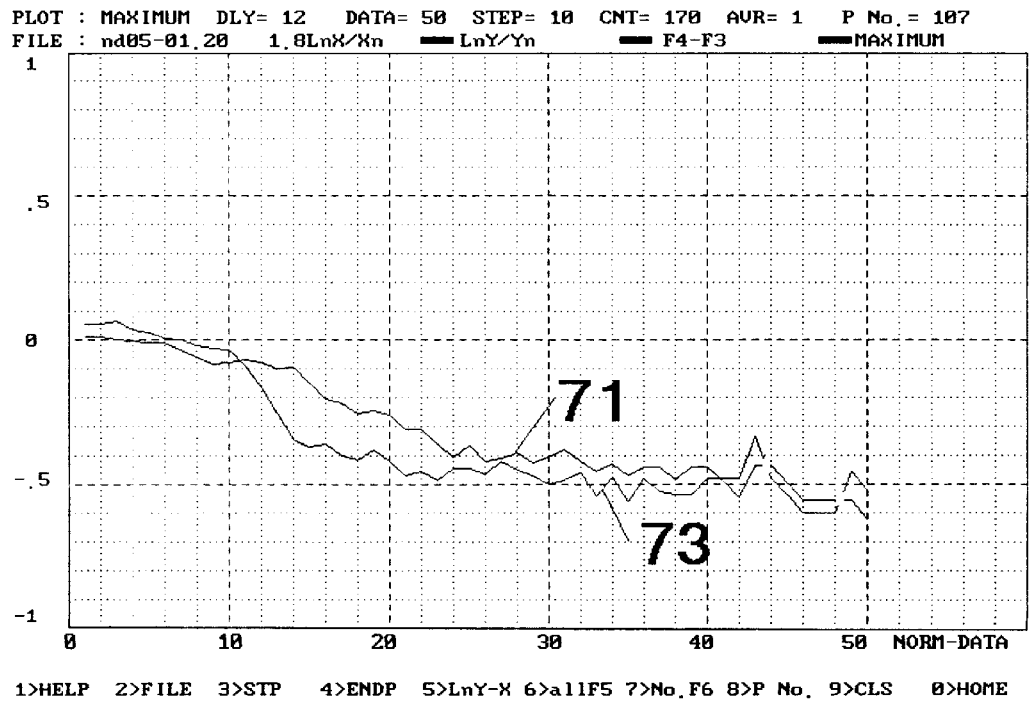
FIG. 5 is a graph illustrating the effect of environmental parameter on the variation of the difference between the measured value of $\{\ln(Y)-(W_1/W_2)\ln(X)+C_3\}$ and the minimum of those measurements for a single pulse in the series of pulses from the end of a laser pulse through the cooling stage.

FIG. 5 shows the effect of an environmental parameter on the variation of the difference between the measured value of $\{\ln(Y)-(W_1/W_2)\ln(X)+C_3\}$ and the minimum of those measurements for a single pulse in the series of pulses from the end of a laser pulse through the cooling stage. The ordinate represents the difference in unitless number and the abscissa represents the measured time from 7.2 msec after the start of a pulse as the number of sampling. The sampling interval is 10 μsec. The trace 71 shows the difference for a bad weld wherein the sudden reduction in the weld pool size disappears due to the thermal insulation from the air gap and the trace 73 shows the difference for a good weld. Other environmental change such as the variation in the cooling speed can also be monitored. Therefore, the slope of weld pool size reduction determined by the difference in the weld pool size at two predetermined positions in time after the aligned time determined above shows the pulse-to-pulse variation in environmental parameters such as a weld gap.

The optimization of chromatic aberration of imaging optics is important for the proper use of the chromatic filtering method in the monitoring of the focus shift. As shown above, it is essential for the monitoring of the weld pool size to measure two spectral band signals at one wavelength $W_1$ quite near to the laser wavelength and at the other wavelength $W_2$ quite far from the wavelength $W_1$ toward the shorter wavelength. However, Eq.(7) shows that any two spectral band signals with large chromatic aberration are good for monitoring of the focus shift. Therefore, another spectral band signal at a wavelength $W_3$ which is located far from the wavelength $W_1$ toward the longer wavelength is required for higher sensitivity in the monitoring of the focus shift. In other words, the wavelength $W_1$ and the wavelength $W_2$ are used for the monitoring of the weld pool size and the wavelength $W_2$ and the wavelength $W_3$ are used for the monitoring of the focus shift. In this case, the measurement of the three spectral band signals is required and one more dichromatic beam splitter has to be added to separate the spectral band signal at the wavelength $W_3$ from the spectral band signal at the wavelength $W_1$. However, if the two spectral band signals at the wavelengths $W_1$ and $W_2$ have enough sensitivity for the monitoring of the focus shift, then the two spectral band signals at the wavelengths $W_1$ and $W_2$ are enough for the comprehensive weld process monitoring of the weld pool size, the weld depth, the weld gap, the focus shift and the laser power variation. The sensitivity of the focus shift monitoring with the two spectral band signals at the wavelength $W_1$ and at the wavelength $W_2$ is analyzed and the selection of the wavelength $W_2$ is optimized.

FIGS. 6A–6E show the focus shift sensitivities for various optical systems. The wavelength 950 nm was chosen as the wavelength $W_1$ because it is very close to the wavelength 1.06 $\mu$m Nd:YAG laser wavelength, but separated far enough from the wavelength 1.06 $\mu$m Nd:YAG laser wavelength to cut out the reflected wavelength 1.06 $\mu$m Nd:YAG laser beam with a band-pass filer of 10 nm bandwidth. To find the general tendency in selecting the best wavelength for $W_2$ and the best glass material, the abscissa of FIGS. 6A–6E is expressed as the chromatically blurred size at the corresponding $W_2$ wavelength and for the selected glass material. The number in the abscissa is expressed as the multiple of the aperature size of 1.0 mm. The ordinate represents the sensitivity of the focus shift for the specified optical system and is expressed as the variation in the $\{\ln(F(W_1,r_0)) - \ln(F(W_2,r_0))\}$, the third term of Eq.(7), per 1 mm focus shift.

Figure 6A:
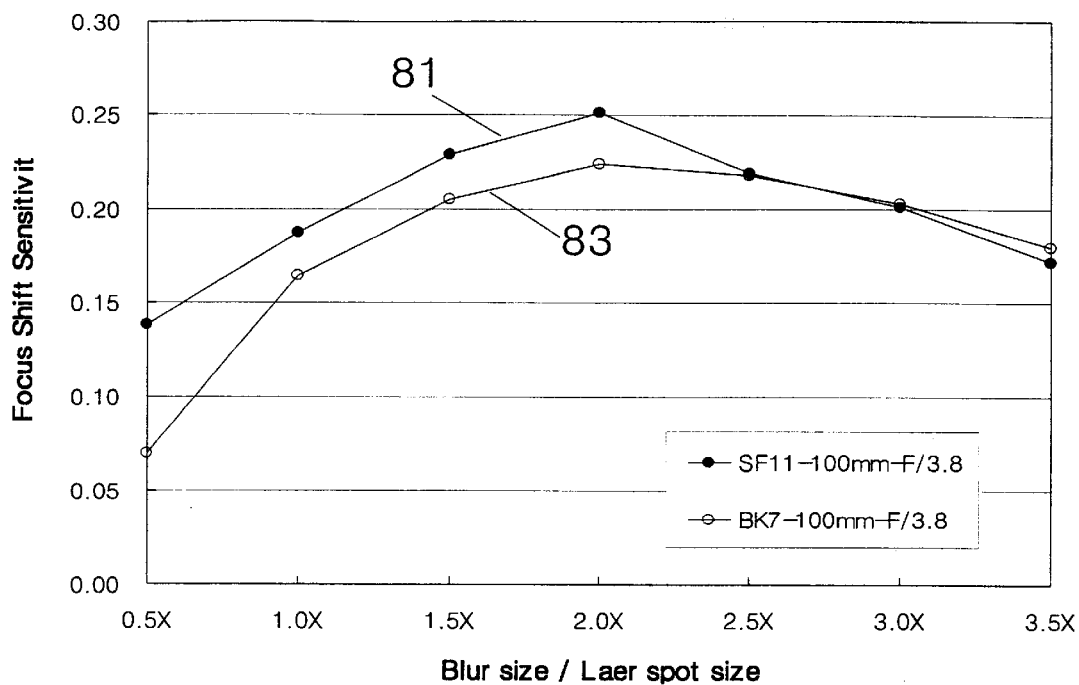
FIG. 6A compares the focus shift sensitivity for different glass material at 100 mm focal length at F/3.8.

FIG. 6A compares the focus shift sensitivity for different glass material with the same focal length of 100 mm and with the same f number of 3.8. The trace 81 shows the focus shift sensitivity for the SF11 high index of refraction glass material and the trace 83 shows the focus shift sensitivity for the BK7 low index of refraction glass material.

Figure 6B:
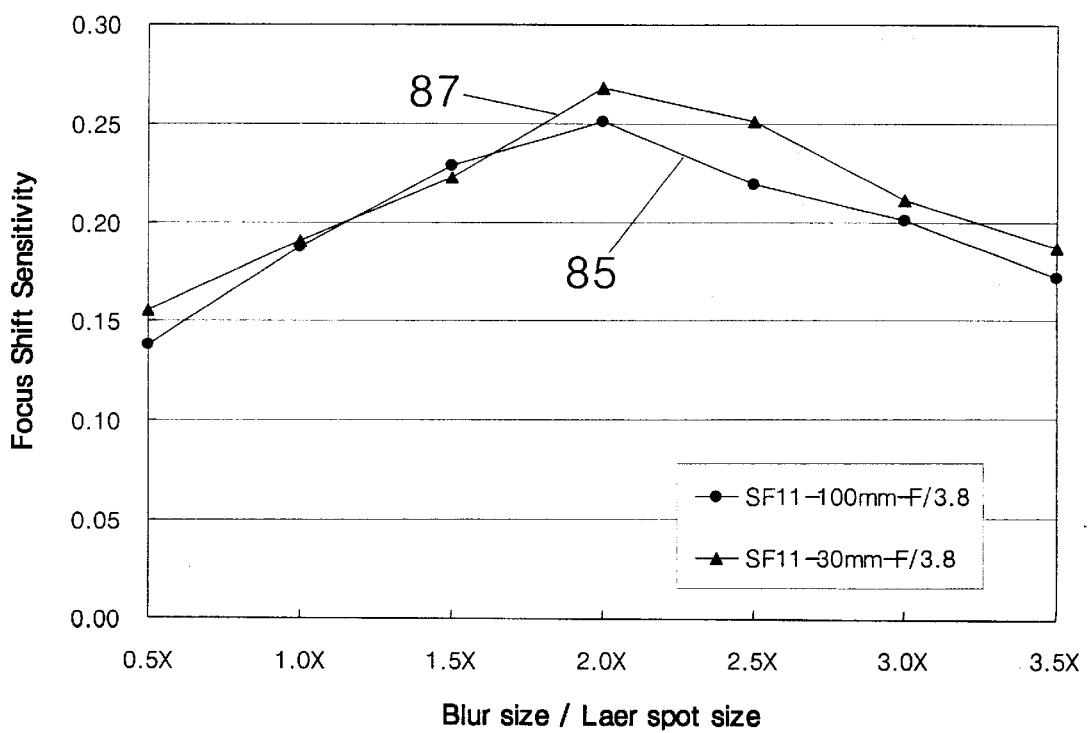
FIG. 6B compares the focus shift sensitivity for different focal length for SF11 high index of refraction glass material.

FIG. 6B compares the focus shift sensitivity of SF11 high index of refraction glass material for different focal length with the same f number of 3.8. The trace 85 shows the focus shift sensitivity for 100 mm focal length and the trace 87 shows the focus shift sensitivity for 30 mm focal length.

Figure 6C:
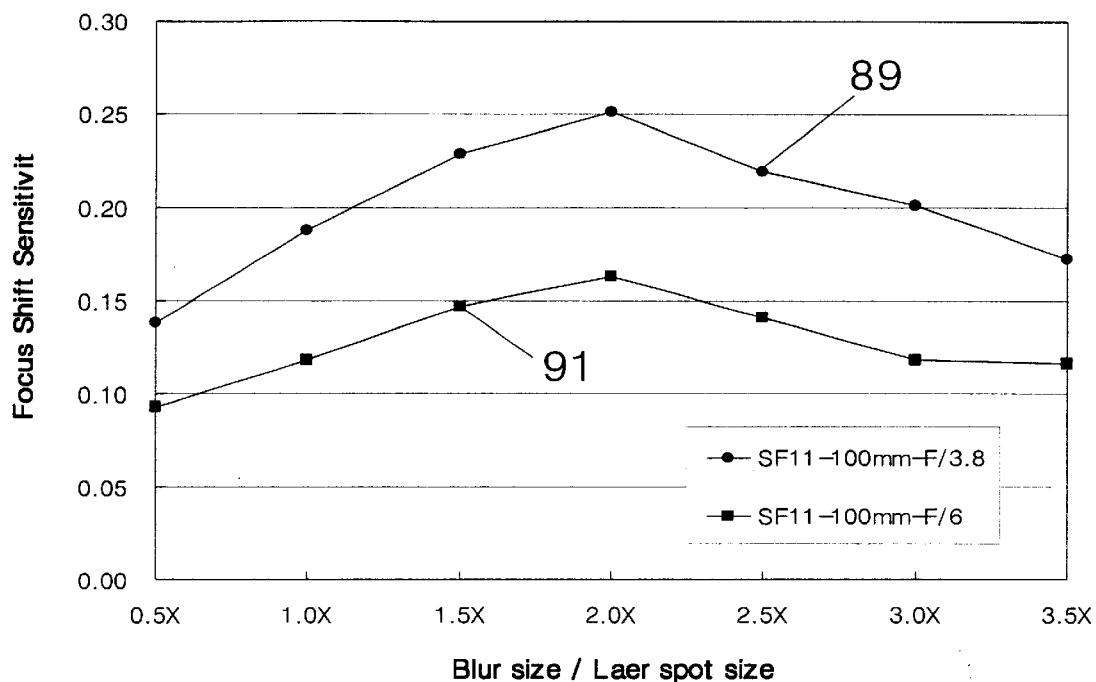
FIG. 6C compares the focus shift sensitivity for different F/number for SF11 high index of refraction glass material at 100 mm focal length.

FIG. 6C compares the focus shift sensitivity of SF11 high index of refraction glass material for different f number with the same focal length of 100 mm. The trace 89 shows the focus shift sensitivity for f number of 3.8 and the trace 91 shows the focus shift sensitivity for f number of 6.0.

Figure 6D:
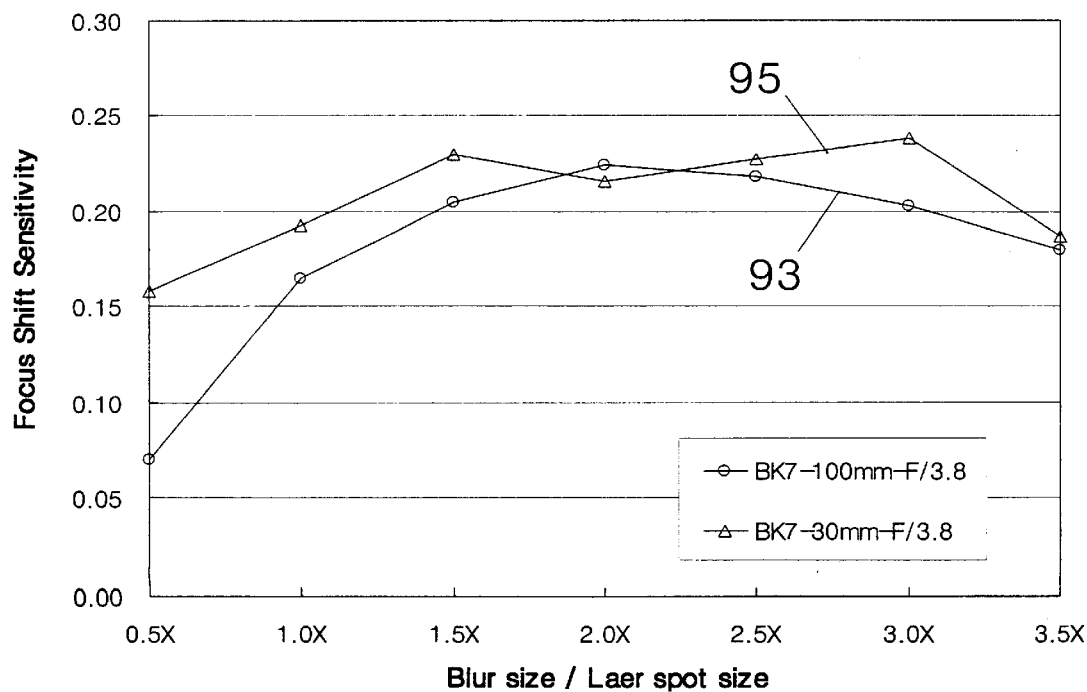
FIG. 6D compares the focus shift sensitivity for different focal length for BK7 low index of refraction glass material at F/3.8.

FIG. 6D compares the focus shift sensitivity of BK7 low index of refraction glass material for different focal length with the same f number of 3.8. The trace 93 shows the focus shift sensitivity for 100 mm focal length and the trace 95 shows the focus shift sensitivity for 30 mm focal length.

Figure 6E:
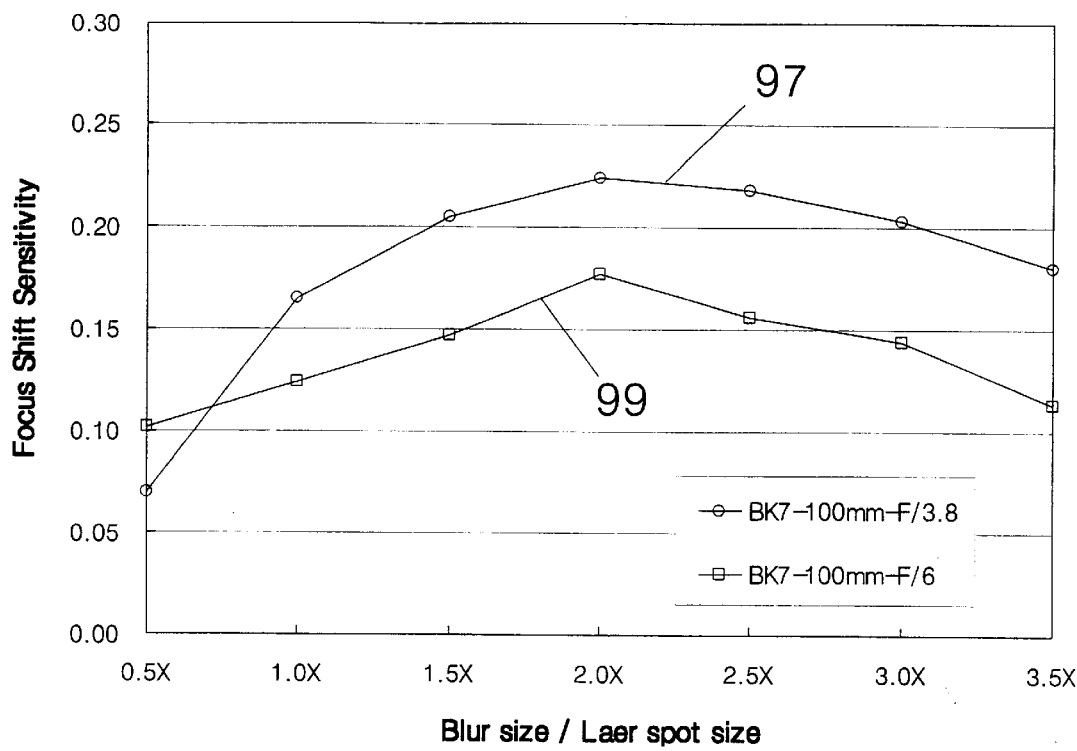
FIG. 6E compares the focus shift sensitivity for different F/number for K7 low index of refraction glass material at 100 mm focal length.

FIG. 6E compares the focus shift sensitivity of BK7 low index of refraction glass material for different f number with the same focal length of 100 mm. The trace 97 shows the focus shift sensitivity for f number of 3.8 and the trace 99 shows the focus shift sensitivity for f number of 6.0. As shown in FIGS. 6A–6E, the wavelength with the blur size of about 2 times the aperature size has the highest sensitivity in the focus shift monitoring for various optical systems. However, the focus shift sensitivity is still high enough for the blur size of from about 0.5 to about 3.5 times the aperature size.

As to the glass optimization, the glass with high index of refraction is required up to 100 mm focal length at F/3.8 because the peak focus shift sensitivity occurs at the 450 nm at 100 mm focal length with F/3.8 for BK7. The peak wavelength shifts to 260 nm for 30 mm focal length at F/3.8 and to 360 nm for 100 mm focal length at F/6.0 for BK7. The thermal radiation at these short spectral bands is too small to be detected. However, the BK7 glass can be used at longer focal length at F/3.8. Furthermore, for slow F/number optical system, the requirement of the high index of refraction glass is more serious. The peak focus shift sensitivity shifts to the 500 nm at 100 mm focal length with F/6.0 for SF11 glass. The peak focus shift sensitivity shifts to the 400 nm at 30 mm focal length with F/3.8 for SF11 glass. In conclusion, as the focal length becomes shorter or the F/number becomes slower, the higher index of refraction glass is required. The lower sensitivity for the slower F/number is acceptable because the lower sensitivity is good enough for the focus control of the slower F/number optical system wherein the depth of focus in optical system increases as the F/number becomes slower.

Figure 7:
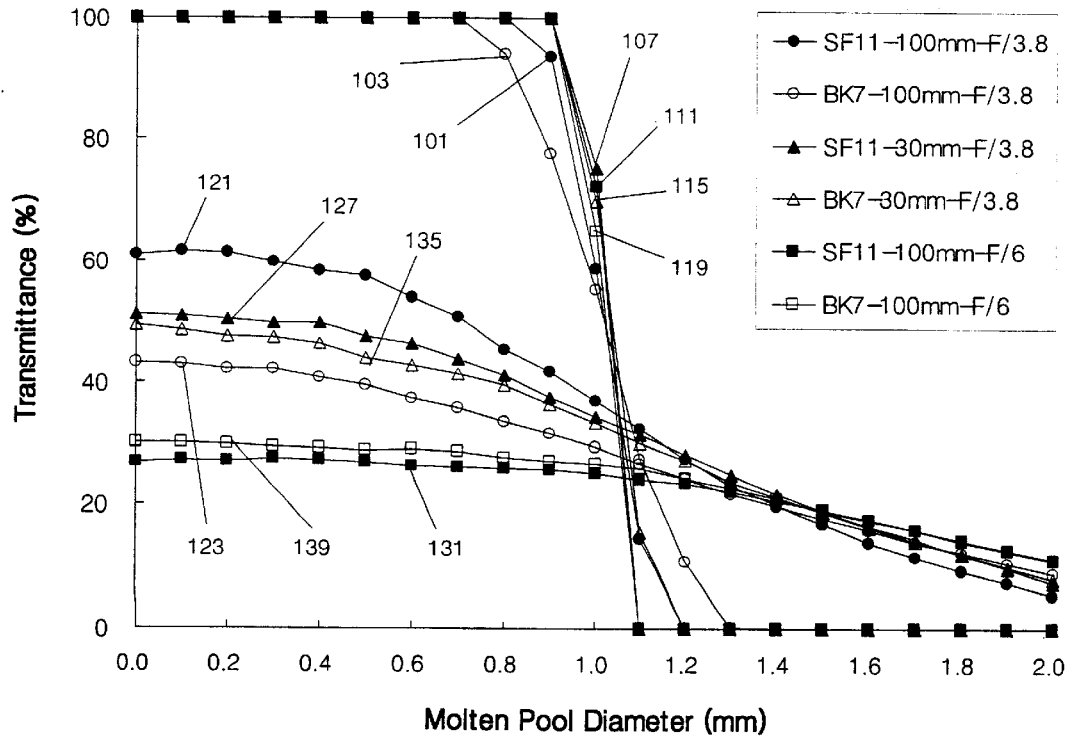
FIG. 7 shows the transmittance curves for the wavelength $W_1$ and he wavelength $W_2$ at the highest sensitivity in FIGS. 6A–6E.

FIG. 7 shows the transmittance curves for the wavelengths $W_1$ and $W_2$ at the highest sensitivity in FIGS. 6A–6E. The trace 101 shows the thansmittance curve for the wavelength $W_1$ at the highest sensitivity of traces 81, 85 and 89 which are the same optical system. The trace 103 shows the thansmittance curve for the wavelength $W_1$ at the highest sensitivity of traces 83, 93 and 97 which are the same optical system. The traces 107,111,115 and 119 show the transmittance curves for the wavelength $W_1$ at the highest sensitivity of traces 87,91,95 and 99 respectively. The trace 121 shows the thansmittance curve for the wavelength $W_2$ at the highest sensitivity of traces 81, 85 and 89 which are the same optical system. The trace 123 shows the thansmittance curve for the wavelength $W_2$ at the highest sensitivity of traces 83, 93 and 97 which are the same optical system. The traces 127,131, 135 and 139 show the transmittance curves for the wavelength $W_2$ at the highest sensitivity of traces 87,91,95 and 99 respectively. Due to the difference in the spherical aberration, there is a small variation in the transmittance curves. However, FIG. 7 shows the general tendency in the transmittance curve for the wavelength $W_2$ at the highest sensitivity. The shape of the transmittance curve for the wavelength $W_2$ at the highest sensitivity supports the conclusion shown above that the wavelength with the blur size of about 2 times the aperature size has the highest sensitivity in the focus shift monitoring for various optical systems.

Figure 8A:
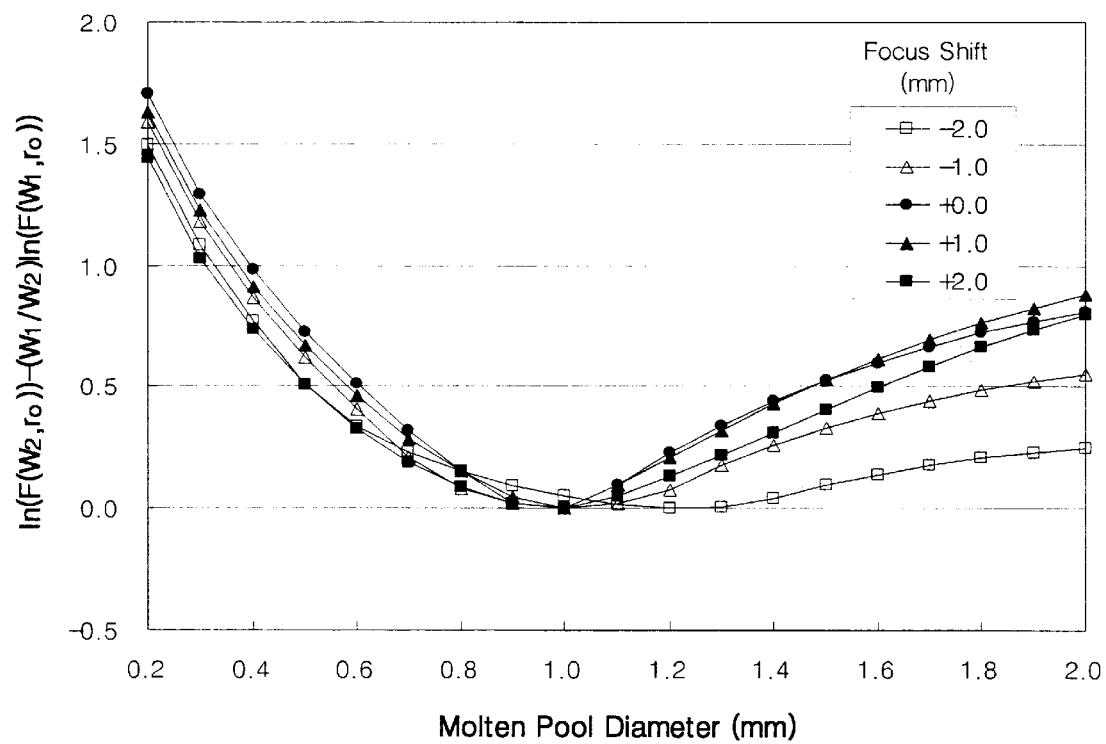
FIG. 8A shows $\ln(F(W_2,r_o))-(W_1/W_2)\ln(F(W_1,r_o))$ and its dependence on the focus shift for an optical system made of high index of refraction glass SF11 with 100 mm focal length at F/3.8 and with the highest focus shift sensitivity.
Figure 8B:
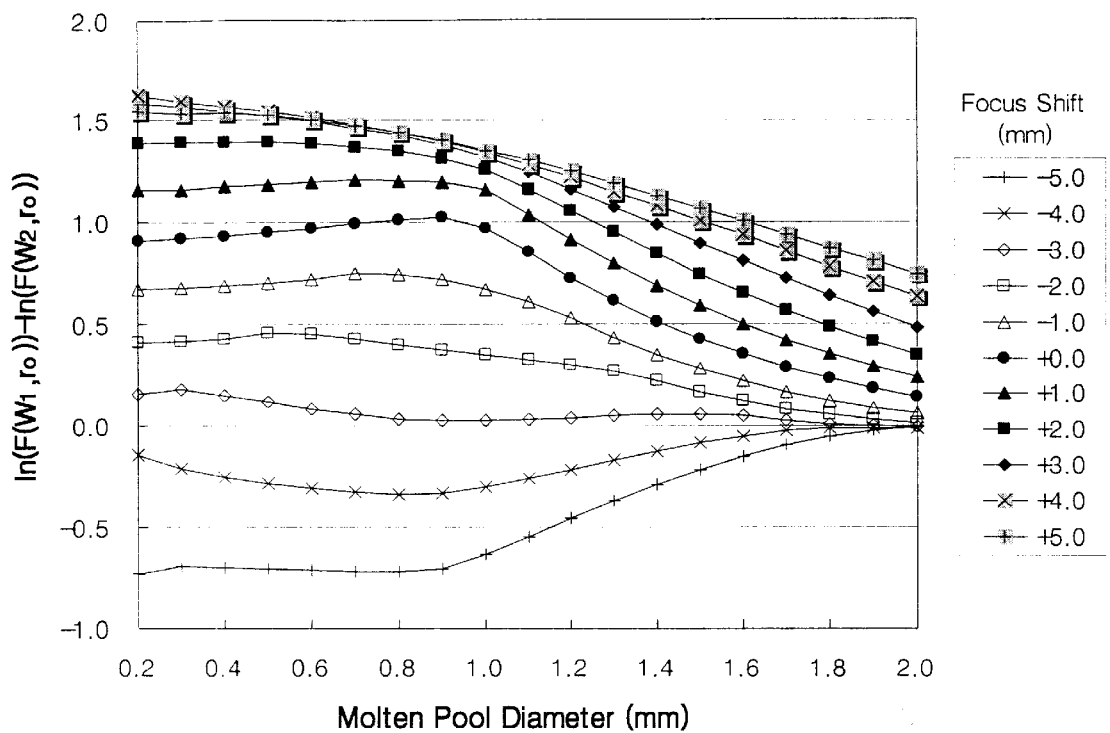
FIG. 8B shows $\ln(F(W_1,r_0))-\ln(F(W_2,r_0))$ and its dependence on the focus shift for an optical system made of high index of refraction glass SF11 with 100 mm focal length at F/3.8 and with the highest focus shift sensitivity.

FIG. 8A shows $\ln(F(W_2,r_0)) - (W_1/W_2)\ln(F(W_1,r_0))$ and its dependence on the focus shift for an optical system made of high index of refraction glass SF11 with 100 mm focal length at F/3.8. FIG. 8B shows $\ln(F(W_1,r_0)) - \ln(F(W_2,r_0))$ and its dependence on the focus shift for the same optical system. The wavelength 950 nm is chosen as the wavelength $W_1$ and the wavelength 600 nm is chosen as the wavelength $W_2$ because the wavelength 600 nm has the highest sensitivity in the focus shift monitoring. If the weld pool size is larger than the laser spot size of 1 mm, $\ln(F(W_1,r_0))-\ln(F(W_2,r_0))$ depends much on the weld pool size. Therefore, if $\ln(F(W_1,r_0))-\ln(F(W_2,r_0))$ measured at a weld pool size larger than the laser spot size 1 mm is used for the focus shift monitoring, the fluctuation in the weld pool size will induces an error in the focus shift monitoring. On the other hand, if $\ln(F(W_1,r_0))-\ln(F(W_2,r0))$ measured at a weld pool size smaller than the laser spot size 1 mm is used for the focus shift monitoring, the fast temperature variation due to the fast cooling will induce an error in the focus shift monitoring. In conclusion, $\ln(F(W_1,r_0))-\ln(F(W_2,r_0))$, measured when the weld pool size becomes the same as the laser spot size, minimizes the induced error in the focus shift monitoring.

However, as shown in FIGS. 8A–8B, the range for the simultaneous monitoring of the focus shift and the weld pool size variation becomes narrowed. As shown in FIG. 8B, the focus shift sensitivity, measured when the weld pool size becomes about 1 mm, becomes zero between the focus shift from +3 mm to +5 mm. However, the long range of focus shift monitoring in the longer direction of focus shift is important in the position control of the imaging optics. Because the welding nozzle is usually separated about a few mm from a workpiece for uniform shielding of the workpiece there is no possibility to control the focus shift more than a few mm toward the shorter direction. However, the chance to control the long focus shift in the longer direction is high in the industrial applications.

Figure 8C:
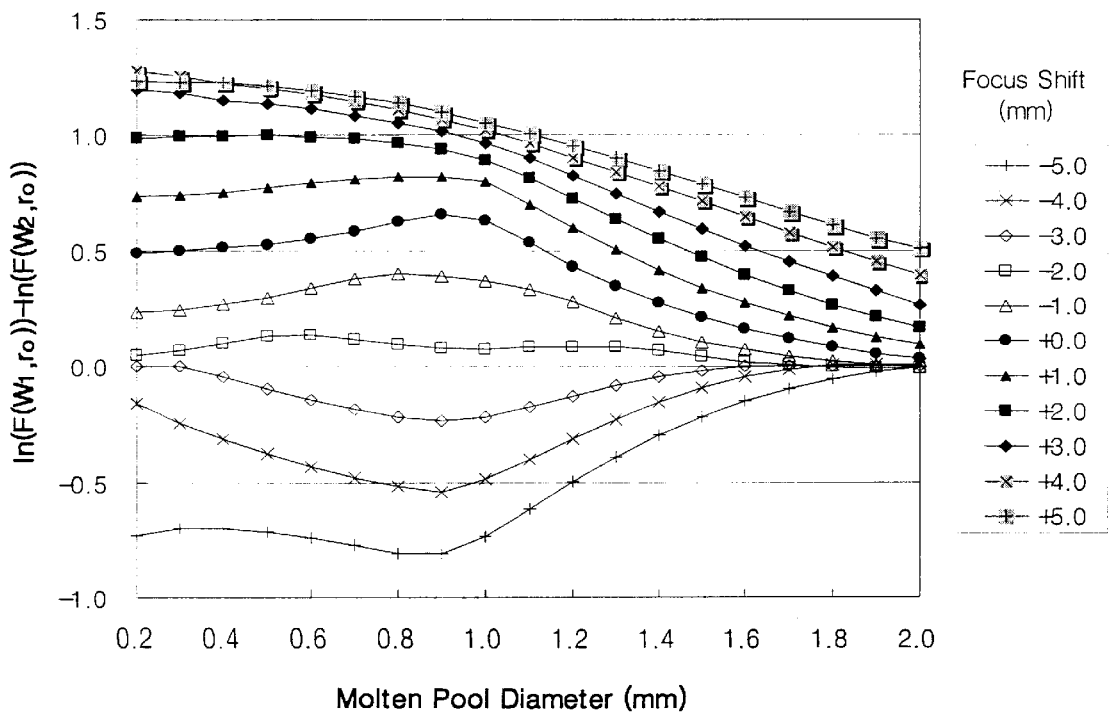
FIG. 8C shows $\ln(F(W_1,r_0))-\ln(F(W_2,r_0))$ and its dependence on the focus shift for an optical system with small shift in $W_2$ toward the longer wavelength from the best wavelength.

Therefore, if the longer range of focus shift monitoring in the longer direction of focus shift is desired, the best wavelength needs to be shifted a little bit toward the longer wavelength. Then, the transmittance profile at this shifted wavelength with some focus shift in the longer direction is the same as the transmittance profile at the best wavelength without any focus shift. This means the longer range of focus shift monitoring in the longer direction of focus shift can be achieved. FIG. 8C shows $\ln(F(W_1,r_0))-\ln(F(W_2,r_0))$ and its dependence on the focus shift for the same optical system at 650 nm. It shows that the range of the focus shift monitoring in the longer direction is increased up to +5 mm.

Figure 9A:
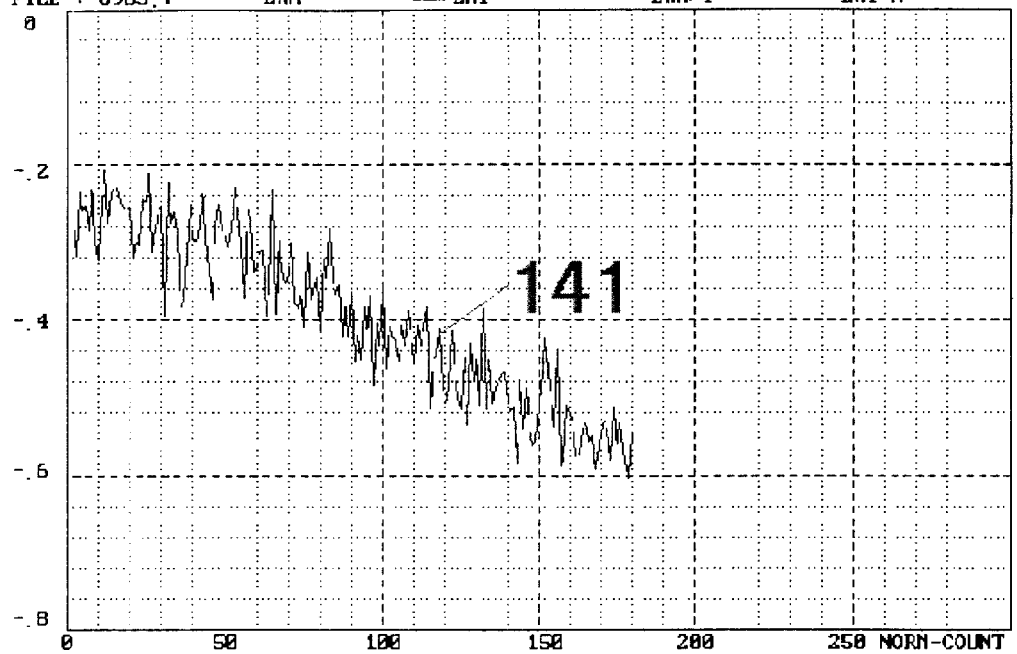
FIG. 9A is a graph illustrating the variation of $\ln(X/Y)$ during a focus shift.
Figure 9B:
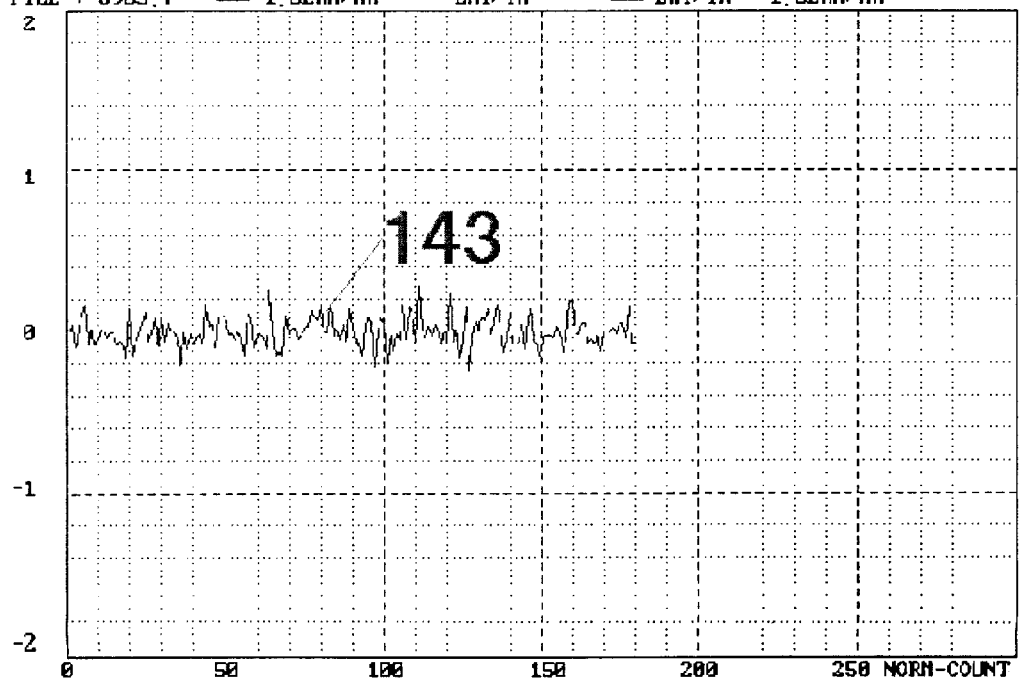
FIG. 9B is a graph illustrating the variation of $\ln(X/X')$ during a focus shift.
Figure 10A:
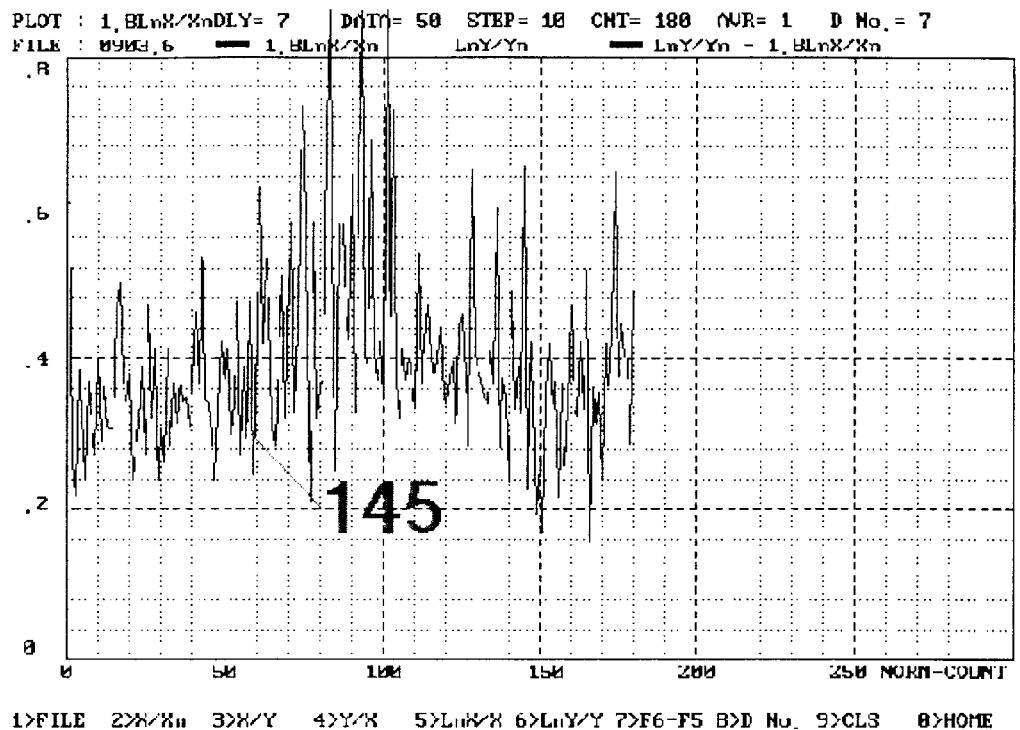
FIG. 10A is a graph illustrating the variation of $\ln(X/X')$ during a power variation.
Figure 10B:
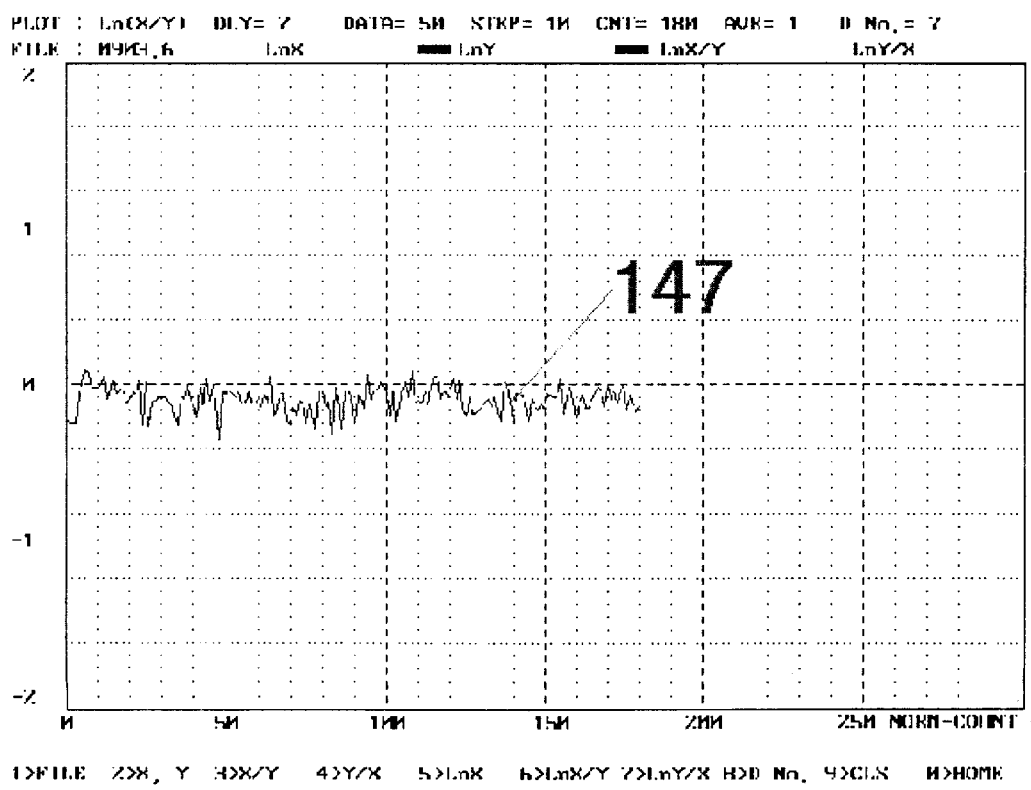
FIG. 10B is a graph illustrating the variation of $\ln(X/Y)$ during a power variation.
Figure 11A:
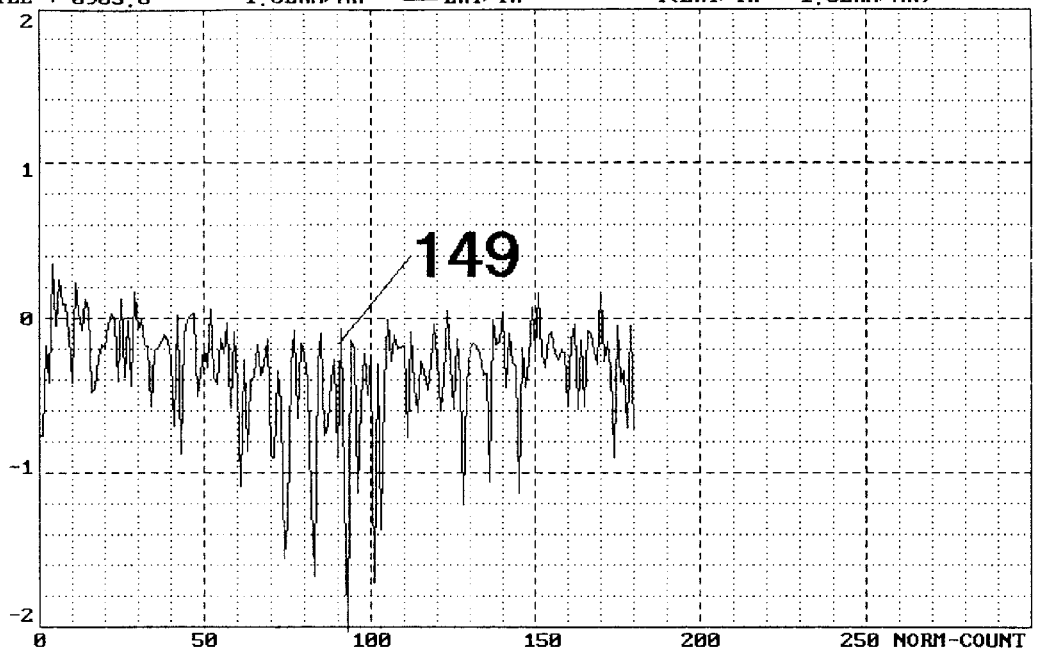
FIG. 11A is a graph illustrating the variation of $\ln(X/X')$ during a simultaneous introduction of a power variation and a focus shift.
Figure 11B:
FIG. 11B is a graph illustrating the variation of $\ln(X/Y)$ during a simultaneous introduction of a power variation and a focus shift.
Figure 12A:
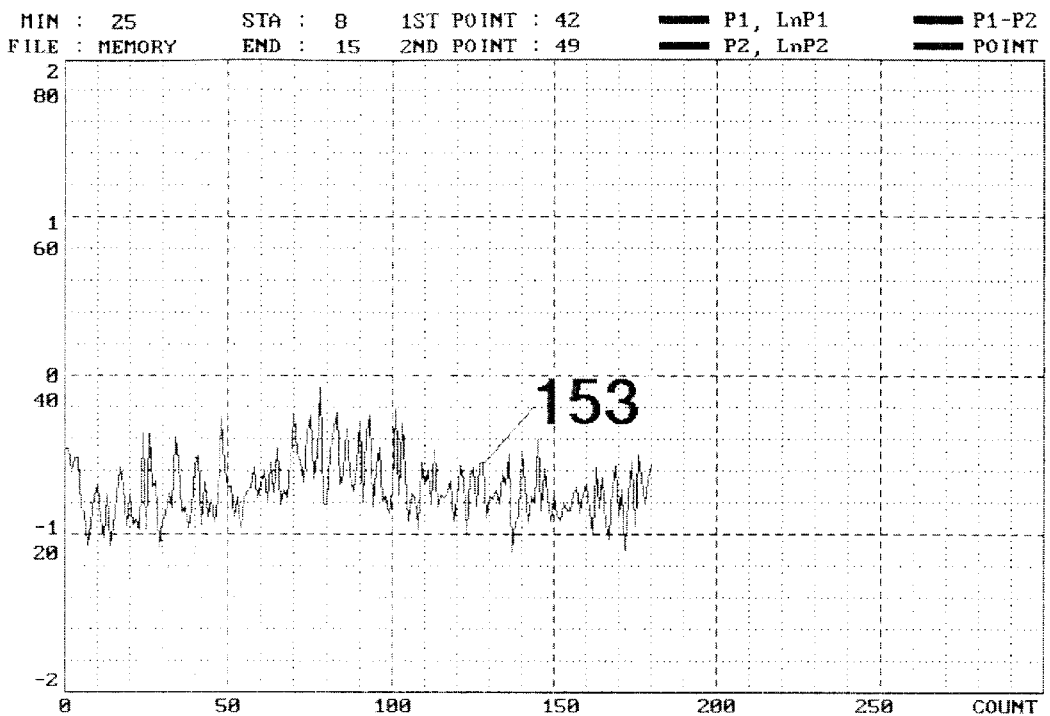
FIG. 12A is a graph illustrating the weld depth variation during a power variation.
Figure 12B:
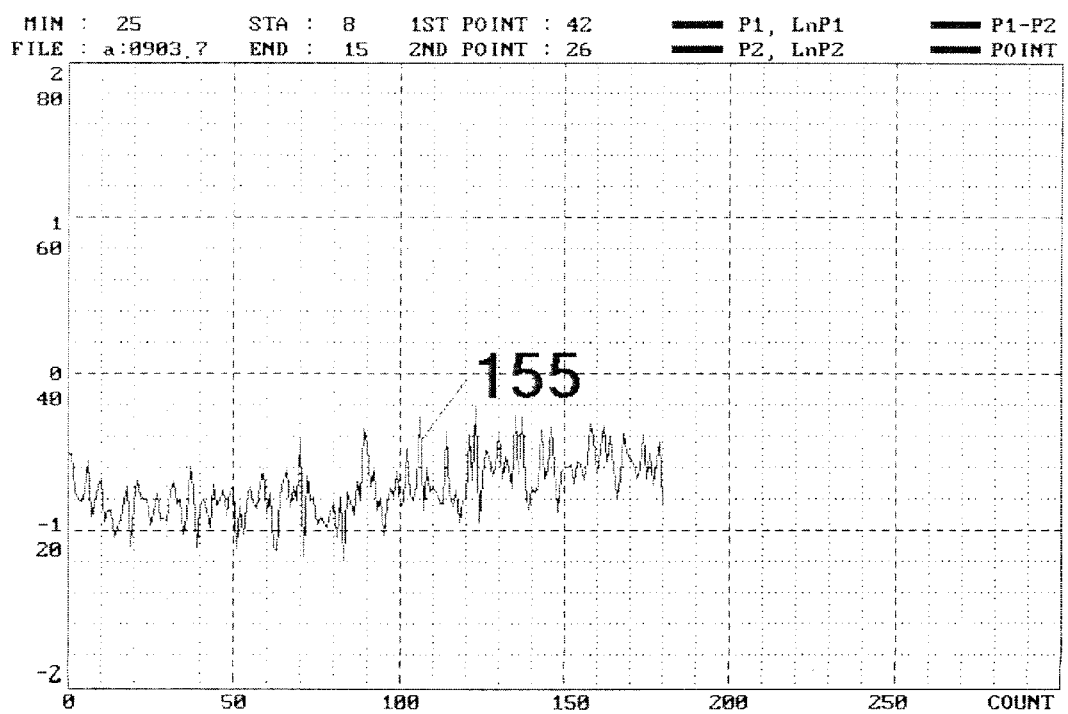
FIG. 12B is a graph illustrating the weld depth variation during a focus shift.
Figure 13:
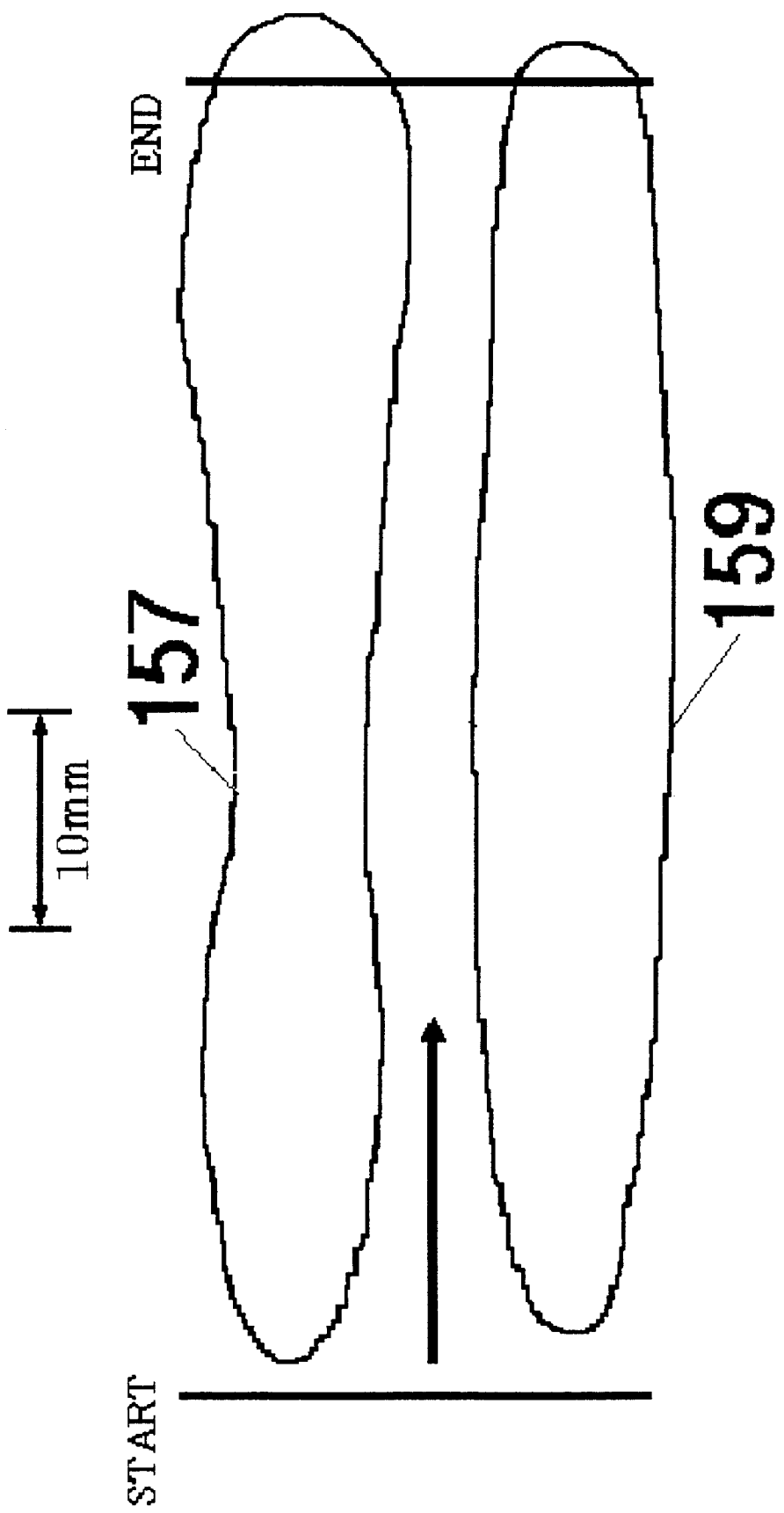
FIG. 13 shows the oxidized burn patterns for a power variation and for a focus shift for comparison with the results from the chromatic filtering.

The following FIGS. 9–12 show the weld process monitoring using the chromatic filtering method. The abscissa represents the movement of 40 mm. The ordinate of these figures is an arbitrary measurement of the processed signals. FIG. 9 shows the monitoring of the focus shift. The trace 141 in FIG. 9A shows the linear variation of ln(XNY) for a focus shift from 0.5 mm to −0.5 mm. At the beginning, the temperature of a workpiece is cold and ln(X/Y) is affected by the cold workpiece temperature. The trace 143 in FIG. 9B shows the insensitivity of ln(X/X') for the same focus shift from 0.5 mm to −0.5 mm. The ln(X/X') shows a linear dependence on the focus shift, but the ln(X/X') does not depend on the focus shift. FIG. 10 shows the monitoring of the power variation. The trace 145 in FIG. 10A shows the variation of ln(X/X') for a power variation from 150 W to 115 W and back to 150 W. The trace 147 in FIG. 10B shows the insensitivity of ln(X/Y) for the same power variation from 150 W to 115 W and back to 150 W. The ln(X/X') shows a linear dependence on the power variation, but the ln(X/Y) does not depend on the power variation. FIG. 11 shows the simultaneous monitoring of the power variation and the focus shift. The laser power was varied from 115 W to 150 W and back to 115 W and the focus was shifted from −0.5 mm to 0.5 mm simultaneously. The trace 149 in FIG. 11A representing the variation of ln(X/X') detects the power variation and the trace 151 in FIG. 11B representing the variation of ln(X/Y) detects the focus shift. At the beginning, it is also affected by the cold workpiece temperature and the trace 151 was averaged for three nearby sampled data. However, the focus shift monitoring can not find the position of best focus. To locate the best focus, the weld depth monitoring is utilized. FIG. 12 shows the weld depth variation obtained from the weld pool size monitoring at a predetermined time. The trace 153 in FIG. 12A represents the weld depth variation for the power variation from 150 W to 115 W and back to 150 W and the trace 155 in FIG. 12B represents the weld depth variation for the focus shift from 0.5 mm to −0.5 mm. The best focus can be located easily within the accuracy less than ±0.3 mm for the focus shift monitoring. FIG. 13 shows the oxidized burn patterns for the power variation and the focus shift for comparison with the results from the chromatic filtering. The trace 157 represents the edge of oxidized burn pattern for the power variation from 150 W to 115 W and back to 150 W and the trace 159 represents the edge of oxidized burn pattern for the focus shift from 0.5 mm to −5 mm.

Figure 14:
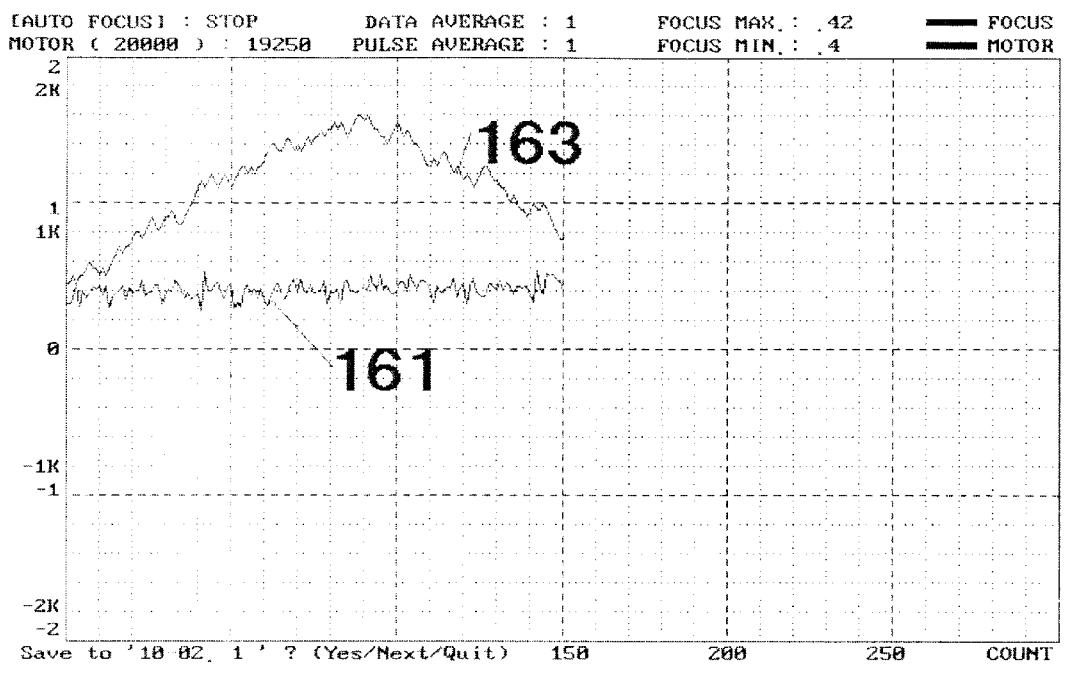
FIG. 14 is a graph illustrating the focus control during a laser welding on a curved surface.

FIG. 14 shows the focus control during a laser welding on a curved surface. In the middle of laser welding, the laser power was varied stepwise from 120 W to 150 W. The trace 161 shows the ln(X/Y) during the laser welding on a curved surface and is not affected by the power variation. The optical system has the focus shift sensitivity of 0.2 per mm shift and the variation in ln(X/Y) is less than 0.2. This means that the focus shift is controlled within ±0.5 mm during a laser welding on a curved surface. If the measured In(XNY) deviates from the preset window of 0.4 and 0.42 in ln(XNY), the deviation is compensated by controlling the position of imaging optics with an attached translator. The trace 163 shows the real movement of the focus lens head shifted by a translator attached to the focusing lens head during the laser welding. Each division corresponds to 0.6 mm movement of the focusing lens head.

Figure 15:
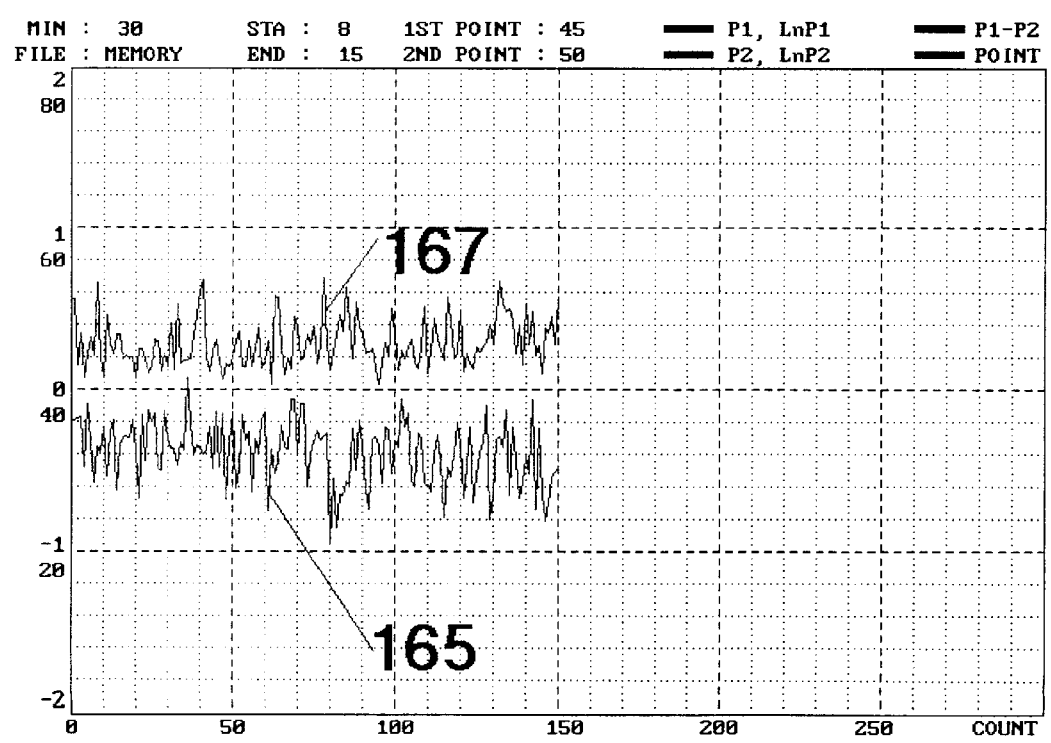
FIG. 15 is a graph illustrating the weld depth and the environmental change monitorings during the same laser welding as shown in FIG. 14.

FIG. 15 shows the monitoring of the weld depth and the environmental change during the same laser welding in FIG. 14. The trace 165 shows the monitoring of the weld depth during the laser welding determined by the weld pool size at a predetermined position in time. The trace 165 shows the sudden increase in weld depth in the middle of laser welding. The trace 167 shows the environmental change during the laser welding determined by the slope of change in the weld pool size calculated at the two predetermined positions in time. The trace 167 shows there is no weld gap or equivalent environmental changes during the laser welding.

Although the present invention has been described in considerable detail with reference to certain preferred versions thereof, many modifications and changes will occur to those skilled in the art. It is, therefore, understood that the appended claims are intended to cover all such modifications and changes which fall within the spirit and scope of the invention.

What is claimed is:

1. A method for real-time monitoring a weld pool size, a weld depth and a weld gap in a pulsed laser welding, the method comprising the steps of:

transmitting a plurality of laser pulses through an aperture which limits a size of a pulsed laser beam;

focusing transmitted laser pulses with at least one lens with large chromatic aberration but minimum spherical aberration on a workpiece;

sensing a thermal radiation from a weld pool through said at least one lens, and through said aperture;

separating the thermal radiation and the laser pulses with a dichromatic mirror;

splitting the thermal radiation with a dichromatic beam splitter into two spectral bands;

filtering each spectral band of the thermal radiation with a narrow band-pass optical filter;

detecting each narrow band-pass filtered thermal radiation with a detector during the laser pulses and between the laser pulses;

sampling electrical signals as detector signals from said detectors digitally for each laser pulse;

processing said two detector signals as processed signals; and analyzing the processed signals for real-time monitoring of the weld pool size, the weld depth and the weld gap.

2. The method of claim 1, wherein filtering with a narrow band-pass filter includes two narrow band-pass filters and a center wavelength of one narrow band-pass filter is close to the pulsed laser wavelength and preferably within about one tenth and up to about two tenths of the pulsed laser wavelength and the other center wavelength of the other narrow band-pass filter is far from the pulsed laser wavelength preferably toward a shorter wavelength.

3. The method of claim 1, wherein processing the sampled detector signals comprises the step of calculating a natural logarithm of digitized data at the wavelength far from the pulsed laser wavelength minus a natural logarithm of the digitized data at the wavelength close to the pulsed laser wavelength multiplied by a ratio of the wavelength close to the laser wavelength to the wavelength far from the pulsed laser wavelength for each sampling.

4. The method of claim 3, wherein analyzing the processed signals for the real-time monitoring of a weld pool size comprises the steps of:

finding a minimum of the natural logarithm of the digitized data at the wavelength far from the pulsed laser wavelength minus the natural logarithm of the digitized data at the wavelength close to the pulsed laser wavelength multiplied by the ratio of the wavelength close to the laser wavelength to the wavelength far from the pulsed laser wavelength from the series of sampled digitized data for each pulse;

calculating, for each sampling, a difference between the natural logarithm of digitized data at the wavelength far from the pulsed laser wavelength minus the natural logarithm of the digitized data at the wavelength close to the pulsed laser wavelength multiplied by the ratio of the wavelength close to the laser wavelength to the wavelength far from the pulsed laser wavelength and the minimum value determined above; and comparing the difference calculated above to a deviation of a predetermined function from a minimum valley in a predetermined function such that the size of a weld pool is determined by choosing the weld pool size wherein the deviation between the value of the predetermined function at that size and the value at the minimum of the predetermined function matches the difference calculated above.

5. The method of claim 4, wherein determining the predetermined function comprises the steps of:

calculating a transmittance through an aperture as a function of position on the weld pool at the wavelength close to the pulsed laser wavelength and at the wavelength far from the pulsed laser wavelength with optical design specifications of the at least one lens;

calculating a first function as a function of a radius r such that a value of the first function is an integration of the transmittance through the aperture at the wavelength close to the pulsed laser wavelength over a weld pool circle with the radius r;

calculating a second function as a function of the radius r such that a value of the second function is an integration of the transmittance through the aperture at the wavelength far from the pulsed laser wavelength over a weld pool circle with the radius r; and calculating a natural logarithm of the second function minus a natural logarithm of the first function multiplied by the ratio of the wavelength close to the laser wavelength to the wavelength far from the pulsed laser wavelength as a function of the radius r.

6. The method of claims 1, 3 or 4, further including the step of monitoring the weld depth in real-time comprising the steps of:

monitoring the weld pool size reduction in time after an end of a laser pulse for each laser pulse;

finding an amount of sudden weld pool size reduction at a predetermined position in time for each laser pulse; and correlating the amount of sudden weld pool size reduction with the weld depth.

7. The method of claims 1, 3 or 4, further including the step of monitoring the weld gap in real-time comprising the steps of:

monitoring the weld pool size reduction in time after an end of a laser pulse for each laser pulse; and comparing a slope of the weld pool size reduction determined by two predetermined positions in time during a cooling stage for each laser pulse wherein substantially slow weld pool size reduction in time is indicative of a weld gap.

8. A method for controlling a focus position of laser spot in a pulsed laser welding, the method comprising the steps of:

transmitting a plurality of laser pulses through an aperture which limits a size of a pulsed laser beam;

focusing transmitted laser pulses with at least one lens with some chromatic aberration but minimum spherical aberration on a workpiece;

sensing a thermal radiation from a weld pool through said at least one lens, and through said aperture;

separating the thermal radiation and the laser pulses with a dichromatic mirror;

splitting the thermal radiation with a dichromatic beam splitter into a plurality of spectral bands;

filtering each spectral band of the thermal radiation with a narrow band-pass optical filter;

detecting each narrow band-pass filtered thermal radiation with a detector during the laser pulses and between the laser pulses;

sampling electrical signals as digitized detector signals from said detectors for each laser pulse;

processing a plurality of digitized detector signals; and analyzing processed signals for real-time control of focus position.

9. The method of claim 8, wherein filtering with a narrow band-pass filter includes at least two narrow band-pass filters and a center wavelength of one narrow band-pass filter is close to the pulsed laser wavelength and preferably within about one tenth and up to about two tenths of the pulsed laser wavelength and a center wavelength of the other narrow band-pass filter is far from the pulsed laser wavelength preferably toward a shorter wavelength.

10. The method of claim 9, wherein the center wavelength far from the pulsed laser wavelength is selected such that a size of a chromatically blurred image of a point thermal radiation source in the weld pool on an aperture plane at the center wavelength is about from 0.5 to about 3.5, but preferably about 2, times a size of the aperture when the pulsed laser is focused on the workpiece.

11. The method of claim 10, wherein an index of refraction of the at least one lens is adjusted such that the size of the chromatically blurred image of a point thermal radiation source in the weld pool on the aperture plane at the center wavelength far from the pulsed laser wavelength is about from 0.5 to about 3.5, but preferably about 2, times the size of the aperture when the pulsed laser is focused on the workpiece.

12. The method of claim 8, wherein processing the digitized detector signals comprises the step of calculating a natural logarithm of a ratio of the digitized detector signal at a wavelength close to the laser wavelength to the digitized detector signal at a wavelength far from the laser wavelength once when the weld pool size shrinks down to about a focused laser spot size and a temperature of a weld pool is still stable.

13. The method of claim 12, wherein analyzing the processed signals for real-time control of focus position comprises the steps of;
   comparing a value of the natural logarithm of the ratio of the digitized detector signal at the wavelength close to the laser wavelength to the digitized detector signal at the wavelength far from the laser wavelength with a predetermined value obtained when the pulsed laser is focused on a workpiece;
   correlating a deviation from the predetermined value with an amount of focus shift from a best focus where the pulsed laser is focused on a workpiece; and
   controlling a position of the at least one lens to compensate the amount of focus shift determined above.

14. The method of claim 13, wherein correlating the amount of the focus shift comprises the steps of:
   calculating a transmittance through the aperture as a function of position on the weld pool at the wavelength close to the pulsed laser wavelength and at the wavelength far from the pulsed laser wavelength when the pulsed laser is focused on the workpiece with optical design specifications of the at least one lens;
   calculating a first function as a function of a radius r such that a value of the first function is an integration of the transmittance through the aperture at the wavelength close to the pulsed laser wavelength over the weld pool circle with the radius r;
   calculating a second function as a function of the radius r such that a value of the second function is an integration of the transmittance through the aperture at the wavelength far from the pulsed laser wavelength over the weld pool circle with the radius r;
   calculating a natural logarithm of the first function minus a natural logarithm of the second function as a function of the radius r;
   plotting the natural logarithm of the first function minus the natural logarithm of the second function as a function of the radius r for a plurality of focus shifted positions in two directions from the best focus;
   finding a focus shift sensitivity which is a ratio of a variation in the natural logarithm of the first function minus the natural logarithm of the second function during the focus shift to an amount of focus shift introduced at a weld pool size equal to a focused laser spot size; and
   determining the amount of the focus shift by dividing the deviation from the predetermined value with the focus shift sensitivity determined above.

15. A method for real-time monitoring a laser power variation on a workpiece in a pulsed laser welding, the method comprising the steps of:
   transmitting a plurality of laser pulses through an aperture which limits a size of a pulsed laser beam;
   focusing transmitted laser pulses with at least one lens with minimum spherical aberration on the workpiece;
   sensing a thermal radiation from a weld pool through said at least one lens, and through said aperture;
   separating the thermal radiation and the laser pulses with a dichromatic mirror;
   filtering the thermal radiation with a narrow band-pass optical filter;
   detecting narrow band-pass filtered thermal radiation with a detector during the laser pulses and between the laser pulses;
   sampling electrical signals as digital detector signals from said detector for each laser pulse;
   processing said digital detector signals; and
   analyzing processed signals for real-time monitoring of a laser power variation on the workpiece.

16. The method of claim 15, wherein filtering with a narrow band-pass filter includes one narrow band-pass filter and a center wavelength of said one narrow band-pass filter is close to the pulsed laser wavelength preferably within about one tenth and up to about two tenths of the pulsed laser wavelength.

17. The method of claim 15, wherein processing the sampled digitized detector signals comprises the step of calculating a natural logarithm of digitized data at a wavelength close to the pulsed laser wavelength for each sampling.

18. The method of claim 17, wherein analyzing the processed signals for real-time monitoring of a laser power variation on the workpiece comprises the steps of,
   selecting two sampled digitized data at an end of each laser pulse wherein the weld pool size is still larger than a focused laser spot size with very short time interval of about 10 $\mu$sec to about 100 $\mu$sec; and
   correlating the natural logarithm of first digitized data minus the natural logarithm of second digitized data with laser power variation on the workpiece.

19. An apparatus for real-time weld process monitoring and control in a pulsed laser welding, the apparatus comprising:
   means for transmitting a plurality of laser pulses through an aperture which limits a size of a pulsed laser beam;
   means for focusing transmitted laser pulses with at least one lens with some chromatic aberration but minimum spherical aberration on a workpiece;
   means for sensing a thermal radiation from a weld pool through said at least one lens, and through said aperture;
   means for separating the thermal radiation and the laser pulses with a dichromatic mirror;
   means for splitting the thermal radiation with dichromatic beam splitters into a plurality of spectral bands;
   means for filtering each spectral band of the thermal radiation with a narrow band-pass optical filter;

means for detecting each narrow band-pass filtered thermal radiation with a single-element detector during laser pulses and between the laser pulses;

means for sampling electrical signals from said detectors digitally for each laser pulse;

means for processing a plurality of digitized detector signals as processed signals; and means for analyzing the processed signals for real-time weld process monitoring and control.

20. The apparatus of claim 19, wherein a distal end of an optical fiber is used as the aperture for an optical fiber deliverable pulsed laser.

21. The apparatus of claim 19, wherein the dichromatic mirror reflecting the pulsed laser and transmitting the thermal radiation, or the dichromatic mirror reflecting the thermal radiation and transmitting the pulsed laser is used to separate the thermal radiation and the pulsed laser.

22. The apparatus of claim 19, wherein beam splitters reflecting one spectral band and transmitting the other spectral band or bands are used to split the spectral bands.

23. The apparatus of claim 19, wherein a bandwidth of the narrow band-pass optical filters is preferably about one hundredth and up to about one tenth of the pulsed laser wavelength.

24. The apparatus of claim 19, wherein means for filtering with a narrow band-pass filter includes at least two narrow band-pass filters and a center wavelength of one narrow band-pass filter is close to the wavelength of pulsed laser preferably within about one tenth and up to about two tenths of the pulsed laser wavelength and a center wavelength of the other narrow band-pass filter is far from the pulsed laser wavelength preferably toward a shorter wavelength.

25. The apparatus of claim 24, wherein the center wavelength far from the wavelength of pulsed laser is selected such that a size of the chromatically blurred image of a point thermal radiation source in the weld pool on an aperture plane at the center wavelength is about from 0.5 to about 3.5, but preferably about 2, times a size of the aperture when the pulsed laser is focused on the workpiece.

26. The apparatus of claim 25, wherein an index of refraction of the at least one lens is adjusted such that the size of the chromatically blurred image of the point thermal radiation source in the weld pool on the aperture plane at the center wavelength far from the wavelength of pulsed laser is about from 0.5 to about 3.5, but preferably about 2, times the size of the aperture when the pulsed laser is focused on the workpiece.

27. The apparatus of claim 19, wherein a plurality of single-element detectors are used in detecting the narrow band-pass filtered thermal radiation.

28. The apparatus of claim 19, wherein means for sampling the electrical signals from said detectors comprises:

means for digitizing the electrical signals from said detectors with a resolution of between 8 bits and 16 bits, but preferably 12 to 16 bits;

means for adjusting a delay between a beginning of each laser pulse and a start of sampling with a resolution of about 0.1 msec;

means for adjusting an interval between consecutive samplings wherein the interval from about 1 $\mu$sec to about 1 msec is preferred; and means for adjusting a number of samplings for each laser pulse.

29. The apparatus of claim 28, wherein the calculation is processed either as soon as the electrical signals from said detectors are digitized or after an end of the samplings for each pulse.

30. The apparatus of claim 19 further including:

means for displaying a signal related to an amount of focus shift for each pulse in realtime;

means for producing an error signal when said signal related to the amount of focus shift is outside a range determined by a predetermined upper limit and a predetermined lower limit;

means for adjusting position of the at least one lens using the error signal provided above and a predetermined focus shift sensitivity to correct the focus shift error;

means for displaying a signal related to power variation on the workpiece for each pulse in real-time;

means for displaying a signal related to the weld pool size variation in time for each pulse in real-time;

means for displaying a signal related to the weld pool size at a predetermined position in time for each pulse in real-time;

means for adjusting power of the laser if the signal related to the weld pool size at a predetermined position in time deviates from the predetermined allowable range; and means for displaying a signal related to a slope of weld pool size reduction determined by two predetermined positions in time for each pulse in real-time.

31. The method of claim 8, wherein an index of refraction of the at least one lens is adjusted such that a size of a chromatically blurred image of a point thermal radiation source in the weld pool on an aperture plane at a center wavelength far from the pulsed laser wavelength is about from 0.5 to about 3.5, but preferably about 2, times a size of the aperture when the pulsed laser is focused on the workpiece.

32. The method of claim 1, wherein analyzing the processed signals for the real-time monitoring of the weld pool size comprises the steps of:

finding a minimum of a natural logarithm of the digitized data at a wavelength far from the pulsed laser wavelength minus a natural logarithm of the digitized data at a wavelength close to the pulsed laser wavelength multiplied by a ratio of the wavelength close to the laser wavelength to the wavelength far from the pulsed laser wavelength from the series of sampled digitized data for each pulse;

calculating, for each sampling, a difference between the natural logarithm of digitized data at the wavelength far from the pulsed laser wavelength minus the natural logarithm of the digitized data at the wavelength close to the pulsed laser wavelength multiplied by the ratio of the wavelength close to the laser wavelength to the wavelength far from the pulsed laser wavelength and the minimum value determined above; and comparing the difference calculated above to a deviation of a predetermined function from a minimum valley in a predetermined function such that the size of the weld pool is determined by choosing the weld pool size wherein the deviation between the value of the predetermined function at that size and the value at the minimum of the predetermined function matches the difference calculated above.

* * * * *